US012780980B2

(12) United States Patent
Izawa et al.

(10) Patent No.: US 12,780,980 B2
(45) Date of Patent: Nov. 3, 2026

(54) POLYETHER POLYCARBONATE DIOL AND METHOD FOR PRODUCING THE SAME

(71) Applicant: Mitsubishi Chemical Corporation, Tokyo (JP)

(72) Inventors: Yusuke Izawa, Tokyo (JP); Ryo Yamashita, Tokyo (JP); Mitsuharu Kobayashi, Tokyo (JP); Kazunao Kusano, Tokyo (JP); Shohei Taniguchi, Tokyo (JP)

(73) Assignee: Mitsubishi Chemical Corporation, Tokyo (JP)

( * ) Notice: Subject to any disclaimer, the term of this patent is extended or adjusted under 35 U.S.C. 154(b) by 858 days.

(21) Appl. No.: 17/456,022

(22) Filed: Nov. 22, 2021

(65) Prior Publication Data

US 2022/0081506 A1 Mar. 17, 2022

Related U.S. Application Data

(63) Continuation of application No. PCT/JP2020/028487, filed on Jul. 22, 2020.

(30) Foreign Application Priority Data

Aug. 7, 2019 (JP) ................................ 2019-145523

(51) Int. Cl.

| | |
|---|---|
| ***C08G 18/44*** | (2006.01) |
| ***C08G 18/08*** | (2006.01) |
| ***C08G 18/10*** | (2006.01) |
| ***C08G 18/32*** | (2006.01) |
| ***C08G 18/48*** | (2006.01) |
| ***C08G 65/20*** | (2006.01) |
| ***C08G 65/26*** | (2006.01) |

(52) U.S. Cl.

CPC ............. *C08G 18/44* (2013.01); *C08G 18/10* (2013.01); *C08G 18/14* (2013.01); *C08G 18/3206* (2013.01); *C08G 18/4854* (2013.01); *C08G 18/4883* (2013.01); *C08G 65/20* (2013.01); *C08G 65/2615* (2013.01); *C08G 65/2648* (2013.01)

(58) Field of Classification Search

CPC ............................ C08G 18/44; C08G 18/4854

See application file for complete search history.

(56) References Cited

U.S. PATENT DOCUMENTS

| | | | | |
|---|---|---|---|---|
| 4,463,141 A * | 7/1984 | Robinson | C08G 18/44 525/460 |
| 4,658,065 A | 4/1987 | Aoshima et al. | |
| 5,173,518 A * | 12/1992 | Bott | C08G 18/10 521/173 |
| 5,847,069 A * | 12/1998 | Greco | C08G 64/183 528/196 |
| 10,316,130 B2 | 6/2019 | Kusano et al. | |
| 10,907,012 B2 | 2/2021 | Kusaka et al. | |
| 11,220,572 B2 | 1/2022 | Kusano et al. | |
| 11,608,405 B2 * | 3/2023 | Hioki | C08G 18/44 |
| 2002/0123595 A1 | 9/2002 | Tanaka et al. | |
| 2015/0291724 A1 * | 10/2015 | Kusano | C08G 64/0208 524/591 |
| 2021/0115191 A1 | 4/2021 | Kusaka et al. | |
| 2022/0073673 A1 | 3/2022 | Kusano et al. | |

FOREIGN PATENT DOCUMENTS

| | | | |
|---|---|---|---|
| CN | 102666626 A | 9/2012 | |
| CN | 104884499 A | 9/2015 | |
| CN | 105452332 A | 3/2016 | |
| CN | 105646817 A | 6/2016 | |
| JP | 61-120830 A | 6/1986 | |
| JP | 2002-256069 A | 9/2002 | |
| JP | 2006-124486 A | 5/2006 | |
| JP | 2006-199799 A | 8/2006 | |
| JP | 2014-080590 A | 5/2014 | |
| JP | 2014-208791 A | 11/2014 | |
| JP | 2015-214599 A | 12/2015 | |
| JP | 2017-222854 A | 12/2017 | |
| WO | WO 2015/170374 A1 | 11/2015 | |
| WO | WO-2018117219 A1 * | 6/2018 | C07C 31/20 |

OTHER PUBLICATIONS

Combined Taiwanese Office Action and Search Report issued Mar. 4, 2024, in corresponding Taiwanese Patent Application No. 109126423 (with English Translation and English Translation of Category of Cited Documents), 10 pages.

(Continued)

*Primary Examiner* — Vickey Nerangis

(74) *Attorney, Agent, or Firm* — Oblon, McClelland, Maier & Neustadt, L.L.P.

(57) ABSTRACT

Provided is a polyether polycarbonate diol, wherein the ratio of the total number of terminal alkoxy groups and terminal aryloxy groups to the total number of all terminal groups is 0.20% or more and 7.5% or less. Controlling the ratio of the total number of terminal alkoxy groups and terminal aryloxy groups to the total number of all terminal groups included in the polyether polycarbonate diol to fall within the preferable range enables a polyurethane having an intended molecular weight to be produced while the occurrence of rapid polymerization reaction is reduced.

17 Claims, No Drawings

(56) References Cited

OTHER PUBLICATIONS

Japanese Office Action issued Apr. 2, 2024 in Japanese Patent Application No. 2020-125482 (with English translation), 12 pages.
Extended European Search Report issued Aug. 22, 2022, in corresponding European Patent Application No. 20849138.1, 8 pages.
Combined Chinese Office Action and Search Report issued May 16, 2023, in corresponding Chinese Patent Application No. 202080033235.4 (with English Translation and English Translation of Category of Cited Documents) 12 pages.
International Search Report issued Sep. 29, 2020 in PCT/JP2020/028487 filed on Jul. 22, 2020, 2 pages.
Korean Office Action issued on Jun. 23, 2025 in Korean Patent Application No. 10-2021-7035522 (with unedited computer-generated English translation), 13 pages.

* cited by examiner

POLYETHER POLYCARBONATE DIOL AND METHOD FOR PRODUCING THE SAME

TECHNICAL FIELD

The present invention relates to a polyether polycarbonate diol used as a raw material for a polyurethane, a polyurethane urea, or the like and a method for producing the polyether polycarbonate diol. The present invention also relates to a method for producing a polyurethane in which the polyether polycarbonate diol is used.

BACKGROUND ART

Polyurethanes have been broadly used for producing a urethane foam, a paint, an adhesive, a sealant, an elastomer, and the like. A polyurethane is constituted by a hard segment formed of an isocyanate and a chain extender and a soft segment formed principally of a polyol. Polyols, which are one of the principal raw materials of a polyurethane, are classified into a polyether polyol, a polyester polyol, a polycarbonate polyol, a polybutadiene polyol, an acryl polyol, etc. by the structure of the molecular chain. As a raw material polyol, a polyol appropriate to the properties required for the polyurethane is selected. Since polytetramethylene ether glycol (hereinafter, may be abbreviated as "PTMG") has high crystallinity among polyether polyols, a polyurethane produced by the reaction of PTMG with an isocyanate has excellent resistance to abrasion, hydrolysis, and tear. Such a polyurethane has been used primarily for producing a spandex, a thermoplastic elastomer, a thermosetting elastomer, an artificial leather, a synthetic leather, and the like.

Polyurethanes produced using polytetramethylene ether glycol have been used in various applications because of the above-described excellent properties.

However, since polytetramethylene ether glycol has a high melting point and a high viscosity, it is difficult to handle polytetramethylene ether glycol. Furthermore, the durability, such as chemical resistance, of a polyurethane produced using polytetramethylene ether glycol is not sufficient for some applications.

In PTL 1, a methyl group is introduced into some of the side chains of the polymerization unit in order to convert into amorphous and a polyether polyol that is liquid at normal temperature is produced.

A polyether polycarbonate diol (hereinafter, may be abbreviated as "PEPCD") produced using a polytetramethylene ether glycol having a low molecular weight is known as a polyol that is liquid at normal temperature (PTL 2).

PTL 1: JP 61-120830 A

PTL 2: JP 2002-256069 A

A polyurethane produced using the polyether polyol according to PTL 1 has poor durability.

Although the PEPCD according to PTL 2 has improved durability, it becomes difficult to control the urethane polymerization reactivity. This makes it impossible to produce a polyurethane having a weight-average molecular weight of about 200,000, which is used for producing a synthetic leather or the like.

SUMMARY OF INVENTION

An object of the present invention is to provide a polyether polycarbonate diol with which a polyurethane having a weight-average molecular weight of about 200,000, which can be used for producing a synthetic leather or the like, can be produced by an easy and simple method.

Solution to Problem

The inventors of the present invention found that using a polyether polycarbonate diol in which the ratio of the total number of terminal alkoxy groups and terminal aryloxy groups to the total number of all terminal groups is controlled to fall within a preferable range makes it easy to control the urethane polymerization reaction, thereby reduces the occurrence of rapid polymerization reaction, and consequently enables the production of a polyurethane having an intended molecular weight.

The summary of the present invention is as follows.

[1] A polyether polycarbonate diol, wherein the ratio of the total number of terminal alkoxy groups and terminal aryloxy groups to the total number of all terminal groups is 0.20% or more and 7.5% or less.

[2] The polyether polycarbonate diol according to [1], wherein the terminal alkoxy group includes a terminal methoxy group.

[3] The polyether polycarbonate diol according to [1] or [2], wherein the terminal alkoxy group includes a terminal butoxy group.

[4] The polyether polycarbonate diol according to any one of [1] to [3], the polyether polycarbonate diol having a hydroxyl value of 11 mg-KOH/g or more and 320 mg-KOH/g or less.

[5] The polyether polycarbonate diol according to any one of [1] to [4], wherein a hydrolysis product produced by mixing the polyether polycarbonate diol with methanol and a 25 weight %-aqueous sodium hydroxide solution, heating the resulting mixture at 75° C. for 30 minutes to perform hydrolysis has a hydroxyl value of 220 mg-KOH/g or more and 750 mg-KOH/g or less.

[6] A method for producing the polyether polycarbonate diol according to any one of [1] to [5], the method comprising:

a step of reacting polytetramethylene ether glycol having a hydroxyl value of 220 mg-KOH/g or more and 750 mg-KOH/g or less with a carbonate compound.

[7] A method for producing a polyurethane, the method comprising conducting an addition polymerization reaction of the polyether polycarbonate diol according to any one of [1] to [5] with a raw material including a compound having a plurality of isocyanate groups.

[8] The method for producing a polyurethane according to [7], wherein the polyurethane is a polyurethane elastomer.

[9] The method for producing a polyurethane according to [8], wherein the polyurethane elastomer is a polyurethane foam.

Advantageous Effects of Invention

The polyether polycarbonate diol according to the present invention makes it possible to easily control the polymerization reaction conducted in the production of a polyurethane and consequently enables the production of a polyurethane having an intended molecular weight.

DESCRIPTION OF EMBODIMENTS

Further details of an embodiment of the present invention are described below. The present invention is not limited to the following aspect without departing from the summary of the invention.

[Polyether Polycarbonate Diol]

In the polyether polycarbonate diol (hereinafter, may be abbreviated as "PEPCD") according to the present invention, the ratio of the total number of terminal alkoxy groups and terminal aryloxy groups to the total number of all terminal groups (hereinafter, this ratio may be referred to as "terminal alkoxy/aryloxy ratio") is 0.20% or more and 7.5% or less.

Note that the term "polyether polycarbonate diol" used herein refers to a "compound including a repeating unit formed of a polyether polycarbonate". The polyether polycarbonate diol according to the present invention is commonly a mixture of a plurality of compounds that include a repeating unit formed of a polyether polycarbonate and different terminal groups.

The PEPCD is produced by the reaction of a carbonate compound, such as an alkylene carbonate, a dialkyl carbonate, or a diaryl carbonate, with a polyether polyol compound and an optional diol compound that is other than the polyether polyol compound and used as needed. In the above reaction, in addition to the target product, that is, a PEPCD including hydroxyl groups at the respective terminals, a terminal alkoxy group resulting from the reaction of a dialkyl carbonate with a polyether polyol compound and a terminal aryloxy group resulting from the reaction of a diaryl carbonate with a polyether polyol compound are produced as a by-product (hereinafter, the above terminal alkoxy group and terminal aryloxy group are referred to collectively as "alkoxy/aryloxy terminals").

The above alkoxy/aryloxy terminals may be brought into the reaction system as impurities included in a polyether polyol compound, such as PTMG, used as a raw material for producing the PEPCD and may enter the resulting PEPCD.

The alkoxy/aryloxy terminals may also enter the PEPCD as a result of heating performed in the step of purifying the PEPCD.

The inventor of the present invention found that controlling the amount of the alkoxy/aryloxy terminals that are produced as a by-product of the above reactions and that enter the reaction product as a result of being included in a raw material compound and brought into the reaction system such that the above terminal alkoxy/aryloxy ratio is 0.2% or more and 75% or less makes it easy to control the urethane polymerization reaction, thereby reduces the occurrence of rapid polymerization reaction, and consequently enables the production of a polyurethane having an intended molecular weight, which is suitable for use in various application of polyurethane.

<Terminal Alkoxy/Aryloxy Ratio>

In the PEPCD according to the present invention, the ratio of the total number of terminal alkoxy groups and terminal aryloxy groups to the total number of all terminal groups (the terminal alkoxy/aryloxy ratio) is 0.20% to 7.5%. If the terminal alkoxy/aryloxy ratio is higher than 7.5%, the urethane polymerization reaction fails to occur to a sufficient degree. If the terminal alkoxy/aryloxy ratio is lower than 0.20%, the urethane polymerization reaction rate is increased to an excessive level and it becomes difficult to control the reaction. If the terminal alkoxy/aryloxy ratio is outside the above range, a polyurethane having an intended molecular weight fails to be produced.

The terminal alkoxy/aryloxy ratio of the PEPCD according to the present invention is preferably 0.20% to 7.0%, is more preferably 0.30% to 6.5%, is further preferably 0.30% to 6.0%, and is particularly preferably 0.40% to 5.5%.

The terminal alkoxy/aryloxy ratio of the PEPCD is determined by the method described in Examples below.

<Alkoxy/Aryloxy Terminals>

As described above, the alkoxy/aryloxy terminals included in the PEPCD according to the present invention are derived principally from a polyether polyol compound and a carbonate compound that are used as a raw material in the production of the PEPCD.

Examples of the terminal alkoxy group include a methoxy terminal, an ethoxy terminal, a propyloxy terminal, and a butoxy terminal. The terminal alkoxy group is preferably a methoxy terminal or a butoxy terminal in consideration of the quality of the PEPCD.

Specific examples of the terminal aryloxy group include a substituted or unsubstituted terminal phenoxy group.

The PEPCD according to the present invention may include only one of the above alkoxy/aryloxy terminals or two or more of the above alkoxy/aryloxy terminals. In the case where the PEPCD according to the present invention includes two or more alkoxy/aryloxy terminals, the total content of the alkoxy/aryloxy terminals is adjusted to fall within the above-described range.

<Method for Controlling Terminal Alkoxy/Aryloxy Ratio>

Examples of the method for controlling the terminal alkoxy/aryloxy ratio of the PEPCD according to the present invention include, but are not limited to, the following (1) to (4).

(1) A method in which a PEPCD that includes alkoxy/aryloxy terminals is mixed with a PEPCD that does not include alkoxy/aryloxy terminals;

(2) A method in which the concentration of alkoxy/aryloxy terminals in a PEPCD including the alkoxy/aryloxy terminals is adjusted by an operation, such as distillation or extraction;

(3) A method in which the contents of alkoxy/aryloxy terminals in the polyether polyol compound, the carbonate compound, and the diol compound that are used as a raw material for PEPCD are controlled; and (4) A method in which the amount of alkoxy/aryloxy terminals produced by the reaction conducted in the production of the PEPCD as a by-product is controlled by, for example, adjusting the pH of the solution.

<Method for Producing PEPCD>

The PEPCD according to the present invention is produced by the reaction of a carbonate compound with a polyether polyol compound in accordance with a common method for producing a PEPCD, except that the above terminal alkoxy/aryloxy ratio is controlled. In the above reaction, as needed, a diol compound other than the polyether polyol compound may be used for copolymerization.

(Carbonate Compound)

The carbonate compound may be an alkylene carbonate, a dialkyl carbonate, or a diaryl carbonate.

Examples of the alkylene carbonate include ethylene carbonate, propylene carbonate, and butylene carbonate.

Examples of the dialkyl carbonate include symmetric dialkyl carbonates, such as dimethyl carbonate, diethyl carbonate, and dibutyl carbonate; and asymmetric dialkyl carbonates, such as methyl ethyl carbonate.

Examples of the diaryl carbonate include symmetric diaryl carbonates, such as diphenyl carbonate and dinaphthyl carbonate; and asymmetric diaryl carbonates, such as phenyl naphthyl carbonate.

Furthermore, chlorocarbonic esters, such as methyl chlorocarbonate and phenyl chlorocarbonate, phosgene and equivalents thereof, and a carbonic acid gas may also be used as a carbonate source.

Among these, an alkylene carbonate and a dialkyl carbonate are preferable, ethylene carbonate and dimethyl carbonate are more preferable, and ethylene carbonate is further preferable.

The above carbonate compounds may be used alone or in a mixture of two or more.

(Polyether Polyol Compound)

The polyether polyol compound can be produced by ring-opening polymerization of a cyclic ether.

The number of carbon atoms constituting the cyclic ether is commonly 2 to 10 and is preferably 3 to 7.

Specific examples of the cyclic ether include tetrahydrofuran (THF), ethylene oxide, propylene oxide, oxetane, tetrahydropyran, oxepane, and 1,4-dioxane.

A cyclic ether the cyclic hydrocarbon chain of which is partially replaced with an alkyl group, a halogen atom, or the like may also be used. Specific examples thereof include 3-methyl-tetrahydrofuran and 2-methyltetrahydrofuran.

The above cyclic ethers may be used alone or in a mixture of two or more and is preferably used alone.

Specific examples of the polyether polyol compound include low-molecular-weight polyether polyols, such as diethylene glycol, triethylene glycol, tetraethylene glycol, and dipropylene glycol; a polyethylene glycol and a polypropylene glycol the number-average molecular weight of which determined on the basis of hydroxyl group is 100 or more and 3000 or less; and a copolymer of ethylene oxide with propylene oxide, polytetramethylene ether glycol (PTMG), a copolymer of THF with 3-methyl-tetrahydrofuran, and dipropylene glycol polyethylene glycol.

Among these, a PTMG having a hydroxyl value of 220 mg-KOH/g or more and 750 mg-KOH/g or less is preferable, a PTMG having a hydroxyl value of 280 mg-KOH/g or more and 700 mg-KOH/g or less is further preferable, and a PTMG having a hydroxyl value of 370 mg-KOH/g or more and 660 mg-KOH/g or less is particularly preferable in consideration of the tensile properties and durability of the resulting polyurethane. Using a PTMG having a hydroxyl value of 750 mg-KOH/g or less limits increases in the degree of crystallinity and melting point of the PEPCD. When the hydroxyl value of the PTMG is 220 mg-KOH/g or more, the viscosity of the PEPCD is not increased to an excessive degree and it becomes markedly easy to handle the PEPCD.

The number-average molecular weight (Mn) of the above PTMG which is determined on the basis of hydroxyl group is preferably 100 or more and 3000 or less, is further preferably 150 or more and 2000 or less, and is particularly preferably 200 or more and 850 or less in consideration of the tensile properties and durability of the resulting polyurethane. When the number-average molecular weight of the PTMG is 100 or more, the increases in the degree of crystallinity and melting point of the PEPCD can be limited. When the number-average molecular weight of the PTMG is 3000 or less, the viscosity of the PEPCD is not increased to an excessive degree and it becomes markedly easy to handle the PEPCD.

The hydroxyl value of PTMG and the number-average molecular weight (Mn) of PTMG which can be calculated on the basis of the hydroxyl value are measured by, for example, the following methods.

<Hydroxyl Value and Number-Average Molecular Weight>

The hydroxyl value of a polyether polyol compound is measured in accordance with JIS K1557-1 by a method in which an acetylating reagent is used.

The number-average molecular weight (Mn) of the polyether polyol compound is calculated using Formula (I) on the basis of the above hydroxyl value.

$$\text{Number-average molecular weight} = 2 \times 56.1/(\text{Hydroxyl value} \times 10^{-3}) \qquad \text{(I)}$$

THF, which is a raw material for PTMG, can be produced by any method known in the related art. Examples thereof include the following methods.

a method including conducting an acetoxylation reaction using butadiene, acetic acid, and oxygen as raw materials to produce diacetoxybutene as an intermediate, hydrogenating and hydrolyzing the diacetoxybutene to form 1,4-butanediol, and performing cyclization dehydration of the 1,4-butanediol;

a method including hydrogenating maleic acid, succinic acid, maleic anhydride, and/or fumaric acid used as a raw material to produce 1,4-butanediol and performing cyclization dehydration of the 1,4-butanediol;

a method including bringing acetylene used as a raw material into contact with an aqueous formaldehyde solution to produce butynediol, hydrogenating the butynediol to produce 1,4-butanediol, and performing cyclization dehydration of the 1,4-butanediol;

a method including oxidizing propylene to produce 1,4-butanediol and performing cyclization dehydration of the 1,4-butanediol;

a method including producing succinic acid by fermentation, hydrogenating the succinic acid to produce 1,4-butanediol, and performing cyclization dehydration of the 1,4-butanediol;

a method including producing 1,4-butanediol from a biomass, such as a sugar, by direct fermentation and performing cyclization dehydration of the 1,4-butanediol; and a method including producing furfural from a biomass and performing decarbonylation and reduction of the furfural.

(Diol Compound)

In the production of the PEPCD, as needed, a diol compound other than the polyether polyol compound may be used for copolymerization. Examples of the diol compound include chain alkyl diols, such as ethylene glycol, 1,3-propanediol, 2-methyl-1,3-propanediol, neopentyl glycol, 1,4-butanediol, 2-methyl-1,4-butanediol, 1,5-pentanediol, 3-methyl-1,5-pentanediol, 1,6-hexanediol, 1,7-heptanediol, 1,8-octanediol, 1,9-nonanediol, 1,10-decanediol, and 1,12-dodecanediol; and cyclic alkyl diols, such as cyclohexanedimethanol and isosorbide.

The other diol compounds above may be used alone or in a mixture of two or more.

(Ratio Between Raw Materials Used)

Although the amount of the carbonate compound used in the production of the PEPCD is not limited, commonly, the lower limit for the molar ratio of the carbonate compound to 1 mole of the polyether polyol compound is preferably 0.35, is more preferably 0.50, and is further preferably 0.60. The upper limit for the above molar ratio is preferably 1.00, is more preferably 0.98, and is further preferably 0.97. When the amount of the carbonate compound used is equal to or less than the above upper limit, the proportion of a PEPCD having terminal groups other than hydroxyl groups can be reduced and it becomes easy to adjust the number-average molecular weight to fall within the predetermined range. When the amount of the carbonate compound used is equal to or more than the above lower limit, it becomes easy to conduct polymerization until the predetermined number-average molecular weight is achieved.

In the case where the other diol compound is used, the lower limit for the molar ratio of the other diol compound used to 1 mole of the polyether polyol compound is preferably 0.05, is more preferably 0.10, and is further preferably 0.20. The upper limit for the above molar ratio is preferably 2.0, is more preferably 1.0, and is further preferably 0.60. In the above case, it is preferable that the molar ratio of the carbonate compound used to 1 mole of the total of the polyether polyol compound and the other diol compound fall within the above range.

(Catalyst)

In the production of the PEPCD, it is preferable to use a catalyst used for transesterification. Examples of the catalyst include metals, such as lithium, sodium, potassium, rubidium, cesium, magnesium, calcium, strontium, barium, zinc, aluminum, titanium, cobalt, germanium, tin, lead, antimony, and cerium; and alkoxides, salts, and oxides of the above metals. It is preferable to use a carbonate salt, a carboxylate salt, a borate salt, a silicate salt, a carbonate salt, an oxide, or an organometallic compound of an alkali metal, an alkaline-earth metal, zinc, titanium, or lead. An organotitanium compound and an organomagnesium compound are particularly preferable.

Commonly, the amount of the transesterification catalyst used is preferably 10 μmol or more and 1500 μmol or less relative to 1 mole of the total amount of the starting materials, that is, the polyether polyol compound and the other diol compound used as needed. The lower limit for the above ratio is more preferably 20 μmol, is further preferably 30 μmol, and is particularly preferably 50 μmol. The upper limit for the above ratio is more preferably 1000 μmol, is further preferably 500 μmol, is particularly preferably 300 μmol, and is most preferably 200 μmol. When the amount of the catalyst used is equal to or more than the above lower limit, the amount of time required by the reaction can be reduced and the production efficiency can be increased accordingly. Furthermore, the staining of the PEPCD can be reduced. When the amount of the catalyst used is equal to or less than the above upper limit, the staining of the PEPCD and staining that occurs in the production of a polyurethane can be reduced. Moreover, the reaction rate of urethane polymerization is not increased to an excessive degree. This may facilitate reaction control.

(Reaction Conditions)

The temperature at which the reaction is conducted in the production of the PEPCD is commonly 70° C. to 250° C. and is preferably 80° C. to 220° C. It is preferable that the above temperature be set to around the boiling point of the raw material carbonate compound, that is, specifically, 100° C. to 150° C., in early stages of the reaction and be gradually increased with the progress of the reaction in order to further conduct the reaction. An alcohol, a phenol, and the like produced in the reaction as by-products are separated by distillation. In the case where a considerable amount of the raw material carbonate compound is lost together with the separated alcohol and the like as a result of distillation, it is preferable to reduce the loss using a reaction container equipped with a plate column or a packed column. In order to reduce the loss, the raw material carbonate compound separated by distillation may be recovered and reused in the reaction system. In the case where a certain amount of the raw material carbonate compound is lost, the theoretical molar ratio between the raw material carbonate compound and the polyether polyol compound and the other diol compound that are used in the production of the PEPCD is such that the amount of the polyether polyol compound and the other diol compound is (n+1) moles relative to n moles of the carbonate compound. With consideration of the above loss, it is preferable to set the amount to be 1.1 to 1.3 times the theoretical molar ratio.

The polyether polyol compound and the other diol compound may be used at early stages of the reaction or in the middle of the reaction.

<Hydroxyl Value, Number-Average Molecular Weight, and Molecular Weight Distribution of PEPCD>

Although the hydroxyl value of the PEPCD according to the present invention is not limited, the lower limit for the hydroxyl value of the PEPCD is commonly 11 mg-KOH/g, is preferably 22.4 mg-KOH/g, is more preferably 28.1 mg-KOH/g, and is further preferably 37.4 mg-KOH/g. The upper limit for the above hydroxyl value is commonly 320 mg-KOH/g, is preferably 187.0 mg-KOH/g, is more preferably 140.3 mg-KOH/g, and is further preferably 112.2 mg-KOH/g. When the above hydroxyl value is equal to or more than the above lower limit, the viscosity is not increased to an excessive degree and it may become easy to handle the PEPCD when a polyurethane is produced using the PEPCD as a raw material. When the above hydroxyl value is equal to or less than the above upper limit, the resulting polyurethane may have suitable flexibility.

It is preferable that, when the PEPCD according to the present invention is mixed with methanol and a 25-weight % aqueous sodium hydroxide solution and the resulting mixture is heated at 75° C. for 30 minutes to perform hydrolysis, the resulting hydrolysate have a hydroxyl value of 220 mg-KOH/g or more and 750 mg-KOH/g or less. When the hydroxyl value of the hydrolysate is 220 mg-KOH/g or more, increases in the degree of crystallinity and melting point of the PEPCD are limited. When the hydroxyl value of the hydrolysate is 750 mg-KOH/g or less, the viscosity of the PEPCD is not increased to an excessive degree and it becomes markedly easy to handle the PEPCD. From the above viewpoints, the hydroxyl value of the hydrolysate is more preferably 280 mg-KOH/g or more and is further preferably 370 mg-KOH/g or more; and is more preferably 700 mg-KOH/g or less and is further preferably 660 mg-KOH/g or less.

A specific method for hydrolyzing the PEPCD is described in Examples below.

Although the molecular weight of the PEPCD according to the present invention is not limited, it is preferable that the lower limit for the number-average molecular weight (Mn) of the PEPCD calculated on the basis of hydroxyl groups be commonly 600, be preferably 800, and be more preferably 1000 and the upper limit for the above number-average molecular weight be commonly 5000, be preferably 4000, and be more preferably 3000. When the number-average molecular weight (Mn) of the PEPCD is 600 or more, the resulting polyurethane has sufficient flexibility. When the number-average molecular weight (Mn) of the PEPCD is 5000 or less, the viscosity of the PEPCD is not increased to an excessive degree and it becomes markedly easy to handle the PEPCD.

The hydroxyl values of the PEPCD and the hydrolysate thereof and the number-average molecular weight (Mn) of the PEPCD can be measured as in the measurement of the hydroxyl value and number-average molecular weight (Mn) of the polyether polyol compound above.

The molecular weight distribution (Mw/Mn) of the PEPCD according to the present invention is commonly 1 or more, is preferably 1.2 or more, and is more preferably 1.5 or more; and is commonly 3 or less, is preferably 2.5 or less, and is more preferably 2.2 or less.

When the above molecular weight distribution is 3 or less, an increase in the number of molecules having high molecular weights and an increase in viscosity can be limited and ease of handling of the PEPCD can be markedly increased. Furthermore, various physical properties of the polyurethane, such as tensile strength, may be enhanced. The lower limit for the above molecular weight distribution is commonly 1 or more.

Note that the molecular weight distribution of the PEPCD is measured by the following method.

<Molecular Weight Distribution (Mw/Mn)>

After a tetrahydrofuran solution of the PEPCD has been prepared, the weight-average molecular weight (Mw) of the PEPCD is measured by gel permeation chromatography (GPC) [product name: "HLC-8220" produced by Tosoh Corporation, column: TskgelSuperHZM-N (4 columns)]. The above weight-average molecular weight (Mw) is divided by the number-average molecular weight (Mn) of the PEPCD, and the quotient (Mw/Mn) is defined as the molecular weight distribution of the PEPCD. The above GPC system is calibrated using "Polytetrahydrofuran Calibration Kit" produced by Polymer Laboratories Ltd., United Kingdom.

<Additives>

Various additives may be added to the PEPCD according to the present invention as needed.

For example, an antioxidant may be added to the PEPCD according to the present invention in order to limit the degradation of the PEPCD caused by oxidation. The antioxidant is used such that the concentration of the antioxidant in the PEPCD to which the antioxidant has been added is commonly 10 ppm by weight or more, is preferably 50 ppm by weight or more, and is more preferably 100 ppm by weight or more; and is commonly 1000 ppm by weight or less, is preferably 500 ppm by weight or less, and is more preferably 300 ppm by weight or less.

When the above antioxidant concentration is equal to or less than the above upper limit, the risk of clogging occurring in the process due to solid precipitation can be reduced. When the antioxidant concentration is equal to or more than the above lower limit, oxidation reactions can be inhibited by a sufficient degree.

The antioxidant is preferably 2,6-di-tert-butyl-p-cresol (BHT) in consideration of its advantageous effects and stability.

[Applications of PEPCD]

The PEPCD according to the present invention is useful as a raw material for polyurethanes that can be suitably used for producing an elastic fiber, a thermoplastic polyurethane, a coating material, or the like since it has an excellent ability to control an urethane polymerization reaction.

In the above-described applications, a polyurethane solution or an aqueous polyurethane emulsion produced using the PEPCD according to the present invention can be used.

The applications of the PEPCD according to the present invention are further described below.

The PEPCD according to the present invention can be used as a raw material for UV curable paints, electron beam curable paints, binders for plastic coatings, lens, or the like, sealants, adhesives, or the like after the terminals of the PEPCD have been modified.

The PEPCD according to the present invention can be used for dispersing nanomaterials, such as nanofiber cellulose, carbon nanofibers, and metal nanoparticles.

<Aqueous Polyurethane Emulsion>

In the case where an aqueous polyurethane emulsion is produced using the PEPCD according to the present invention, when a prepolymer is produced by the reaction of a certain amount of polyol including the PEPCD according to the present invention with an excessive amount of polyisocyanate, a compound having at least one hydrophilic functional group and at least two isocyanate reactive groups is mixed with the above materials. Subsequently, a step of neutralizing the hydrophilic functional group to form a salt, a step of performing emulsification by addition of water, and a step of conducting a chain extension reaction are conducted to produce an aqueous polyurethane emulsion.

The hydrophilic functional group is, for example, a group neutralizable with an alkaline group, such as a carboxyl group or a sulfonic group. The isocyanate reactive group is a group that commonly reacts with an isocyanate to form a urethane linkage or a urea linkage, such as a hydroxyl group, a primary amino group, or a secondary amino group. The hydrophilic functional group and the isocyanate reactive group may be included in the same molecule in a mixed manner.

Specific examples of the compound having at least one hydrophilic functional group and at least two isocyanate reactive groups include 2,2'-dimethylolpropionic acid, 2,2-methylolbutyric acid, and 2,2'-dimethylolvaleric acid. Examples of the above compound further include diaminocarboxylic acids, such as lysine, cystine, and 3,5-diaminocarboxylic acid. The above compounds may be used alone or in combination of two or more. When the above compounds are used in practice, they may be neutralized with an amine, such as trimethylamine, triethylamine, tri-n-propylamine, tributylamine, or triethanolamine, or an alkaline compound, such as sodium hydroxide, potassium hydroxide, or ammonia.

In the case where an aqueous polyurethane emulsion is produced, the lower limit for the amount of the compound having at least one hydrophilic functional group and at least two isocyanate reactive groups is preferably 1% by weight, is more preferably 5% by weight, and is further preferably 10% by weight of the total weight of the PEPCD according to the present invention and polyols other than the PEPCD in order to enhance dispersibility in water. The upper limit for the amount of the above compound is preferably 50% by weight, is more preferably 40% by weight, and is further preferably 30% by weight in order to maintain the properties of the polycarbonate diol.

In the case where an aqueous polyurethane emulsion is produced, the reaction in the prepolymer step may be conducted in the presence of a solvent, such as methyl ethyl ketone, acetone, or N-methyl-2-pyrrolidone, or in the absence of a solvent. In the case where a solvent is used, it is preferable to remove the solvent by distillation after the aqueous emulsion has been produced.

In the case where an aqueous polyurethane emulsion is produced using the PEPCD according to the present invention as a raw material in the absence of a solvent, the upper limit for the number-average molecular weight of the PEPCD which is determined on the basis of hydroxyl value is preferably 5000, is more preferably 4500, and is further preferably 4000, and the lower limit for the number-average molecular weight of the PEPCD is preferably 300, is more preferably 500, and is further preferably 800. When the number-average molecular weight of the PEPCD which is determined on the basis of hydroxyl value falls within the above range, it may become easy to form an emulsion.

In the synthesis or storage of the aqueous polyurethane emulsion, emulsification stability may be maintained using, for example, the following surfactants in combination with one another: anionic surfactants, such as a higher fatty acid, a resin acid, an acidic fatty alcohol, a sulfuric ester, a higher alkyl sulfonate, an alkyl aryl sulfonate, sulfonated castor oil, and a sulfosuccinic ester; cationic surfactants, such as a primary amine salt, a secondary amine salt, a tertiary amine salt, a quaternary amine salt, and a pyridinium salt; and nonionic surfactants, such as a known product of reaction between ethylene oxide and a long-chain fatty alcohol or a phenol.

In the production of the aqueous polyurethane emulsion, as needed, water may be mechanically added to an organic solvent solution of the prepolymer at a high shear stress in the presence of an emulsifier, without conducting the above neutralization-salt formation step.

The aqueous polyurethane emulsion produced in the above-described manner can be used in various applications. In particular, there has been a demand for environmentally-friendly raw materials for chemicals. An aqueous polyurethane emulsion which does not include an organic solvent may be used as an alternative to conventional items.

Specific examples of suitable application of the aqueous polyurethane emulsion include a coating agent, an aqueous paint, an adhesive, a synthetic leather, and an artificial leather. In particular, since the PEPCD according to the present invention includes the alkoxy/aryloxy terminals such that the terminal alkoxy/aryloxy ratio falls within the predetermined range, an aqueous polyurethane emulsion produced using the PEPCD is flexible and can be effectively used as a coating agent or the like compared with the aqueous polyurethane emulsions known in the related art which are produced using polycarbonate diol and/or PTMG. Specifically, since such an aqueous polyurethane emulsion includes a hydrophilic group, it has a higher affinity for water than the aqueous polyurethane emulsions known in the related art which are produced using PTMG. This enables the use of the PEPCD according to the present invention, which has a high molecular weight. As a result, the soft-feeling and clarity of a coating film, a synthetic leather, an artificial leather, and the like can be enhanced.

Since an aqueous polyurethane emulsion produced using the PEPCD according to the present invention has excellent dispersibility in water, the degree of flexibility in the design of molecules of the aqueous polyurethane emulsion is increased. This enables a matt feeling to be achieved by adjusting composition.

The storage stability of a polyurethane solution or aqueous polyurethane emulsion produced using the PEPCD according to the present invention with an organic solvent and/or water can be determined by adjusting the concentration of polyurethane in the solution or emulsion (hereinafter, this concentration may be referred to as "solid content concentration") to be 1% to 80% by weight, then storing the solution or emulsion under a specific temperature condition, and subsequently, for example, visually inspecting changes of the solution or emulsion. For example, in the case where a polyurethane solution (a liquid mixture of N,N-dimethylformamide/toluene, solid content concentration: 30 weight %) is produced by the later-described two-step method using the PEPCD according to the present invention, 4,4'-dicyclohexylmethane diisocyanate, and isophoronediamine, the amount of time during which no change of the polyurethane solution is visually confirmed when the polyurethane solution is stored at 10° C. is preferably 1 month, is more preferably 3 months or more, and is further preferably 6 months or more.

[Method for Producing Polyurethane]

A method for producing a polyurethane according to the present invention is a method in which an addition polymerization reaction of the PEPCD according to the present invention with a raw material including a compound including a plurality of isocyanate groups (hereinafter, this compound may be referred to as "polyisocyanate compound" or "polyisocyanate") is conducted to produce a polyurethane (hereinafter, may be referred to as "polyurethane according to the present invention").

The method for producing a polyurethane according to the present invention includes using the PEPCD according to the present invention. The polyurethane according to the present invention can be produced by a common polyurethane formation reaction, except that the PEPCD according to the present invention, a polyisocyanate compound, and a chain extender are commonly used.

For example, the polyurethane according to the present invention can be produced by causing the PEPCD according to the present invention to react with a polyisocyanate compound and a chain extender within a temperature range from normal temperature to 200° C.

Specifically, first, a certain amount of the PEPCD according to the present invention is caused to react with an excessive amount of polyisocyanate compound in order to produce a prepolymer including an isocyanate group at terminals. Furthermore, a chain extender is used to increase the degree of polymerization. Hereby, the polyurethane according to the present invention can be produced.

<Polyisocyanate Compound>

The polyisocyanate compound used as a raw material for producing the polyurethane according to the present invention may be any polyisocyanate compound including two or more isocyanate groups. Examples thereof include the aliphatic, alicyclic, and aromatic polyisocyanate compounds known in the related art.

Examples thereof include aliphatic diisocyanate compounds, such as tetramethylene diisocyanate, hexamethylene diisocyanate, 2,2,4-trimethylhexamethylene diisocyanate, 2,4,4-trimethylhexamethylene diisocyanate, lysine diisocyanate, and a dimer diisocyanate produced by converting carboxyl groups included in a dimer acid into isocyanate groups; alicyclic diisocyanate compounds, such as 1,4-cyclohexane diisocyanate, isophorone diisocyanate, 1-methyl-2,4-cyclohexane diisocyanate, 1-methyl-2,6-cyclohexane diisocyanate, 4,4'-dicyclohexylmethane diisocyanate, and 1,3-bis(isocyanatomethyl)cyclohexane; and aromatic diisocyanate compounds, such as xylylene diisocyanate, 4,4'-diphenyl diisocyanate, toluene diisocyanate (2,4-toluene diisocyanate and 2,6-toluene diisocyanate), m-phenylene diisocyanate, p-phenylene diisocyanate, 4,4'-diphenylmethane diisocyanate, 4,4'-diphenyldimethylmethane diisocyanate, 4,4'-dibenzyl diisocyanate, dialkyldiphenylmethane diisocyanate, tetraalkyldiphenylmethane diisocyanate, 1,5-naphthylene diisocyanate, 3,3'-dimethyl-4,4'-biphenylene diisocyanate, polymethylenepolyphenyl isocyanate, phenylene diisocyanate, and m-tetramethylxylylene diisocyanate. The above polyisocyanate compounds may be used alone or in combination of two or more.

Among these, aromatic polyisocyanate compounds are preferable in consideration of reactivity with the PEPCD and the curability of the resulting polyurethane. In particular, 4,4'-diphenylmethane diisocyanate (hereinafter, may be referred to as "MDI"), toluene diisocyanate (TDI), and xylylene diisocyanate are preferable since they are industrially available in large amounts at low costs.

<Chain Extender>

The chain extender used as a raw material for producing the polyurethane according to the present invention is a low-molecular-weight compound including at least two active hydrogen atoms reactive with an isocyanate group and is selected from polyols and polyamines.

Specific examples thereof include linear diols, such as ethylene glycol, 1,3-propanediol, 1,4-butanediol, 1,5-pentanediol, 1,6-hexanediol, 1,8-octanediol, 1,9-nonanediol, 1,10-decanediol, and 1,12-dodecanediol; diols including a branched chain, such as 2-methyl-1,3-propanediol, 2,2-dimethyl-1,3-propanediol, 2,2-diethyl-1,3-propanediol, 2-methyl-2-propyl-1,3-propanediol, 2,4-heptanediol, 1,4-dimethylolhexane, 2-ethyl-1,3-hexanediol, 2,2,4-trimethyl-1,3-pentanediol, 2-methyl-1,8-octanediol, 2-butyl-2-ethyl-1,3-propanediol, and a dimer diol; diols including an ether group, such as diethylene glycol and propylene glycol; diols including an alicyclic structure, such as 1,4-cyclohexanediol, 1,4-cyclohexanedimethanol, and 1,4-dihydroxyethylcyclohexane; diols including an aromatic group, such as xylylene glycol, 1,4-dihydroxyethylbenzene, and 4,4'-methylene bis(hydroxyethylbenzene); polyols, such as glycerin, trimethylolpropane, and pentaerythritol; hydroxylamines, such as N-methylethanolamine and N-ethylethanolamine; and polyamines, such as ethylenediamine, 1,3-diaminopropane, hexamethylenediamine, triethylenetetramine, diethylenetriamine, isophoronediamine, 4,4'-diaminodicyclohexylmethane, 2-hydroxyethylpropylenediamine, di-2-hydroxyethylethylenediamine, di-2-hydroxyethylpropylenediamine, 2-hydroxypropylethylenediamine, di-2-hydroxypropylethylenediamine, 4,4'-diphenylmethanediamine, methylene bis (o-chloroaniline), xylylenediamine, diphenyldiamine, tolylenediamine, hydrazine, piperazine, and N,N'-diaminopiperazine.

The above chain extenders may be used alone or in combination of two or more.

Among these, ethylene glycol, 1,4-butanediol, and 1,6-hexanediol are preferable in order to achieve phase separation between the soft and hard segments of the resulting polyurethane at an excellent level and thereby achieve excellent flexibility and excellent elastic recovery. In addition, they are industrially available in large amounts at low costs.

<Chain Stopper>

In the production of the polyurethane according to the present invention, a chain stopper including one active hydrogen group can be used as needed in order to control the molecular weight of the resulting polyurethane.

Examples of the chain stopper include aliphatic mono-ols having one hydroxyl group, such as methanol, ethanol, propanol, butanol, and hexanol; and aliphatic monoamines having one amino group, such as diethylamine, dibutylamine, n-butylamine, monoethanolamine, diethanolamine, and morpholine.

The above chain stoppers may be used alone or in combination of two or more.

<Catalyst>

In the polyurethane formation reaction conducted for producing the polyurethane according to the present invention, the following publicly known urethane polymerization catalysts may be used: amine catalysts, such as triethylamine, N-ethylmorpholine, and triethylenediamine; acid catalysts, such as acetic acid, phosphoric acid, sulfuric acid, hydrochloric acid, and sulfonic acid; tin compounds, such as trimethyltin laurate, dibutyltin dilaurate, dioctyltin dilaurate, and dioctyltin dineodecanoate; organic metal salts, such as a titanium compound; and the like. The above urethane polymerization catalysts may be used alone or in combination of two or more.

<Polyol Other Than PEPCD According to Present Invention>

In the polyurethane formation reaction conducted for producing the polyurethane according to the present invention, a polyol other than the PEPCD according to the present invention may be used as needed. The polyol other than the PEPCD according to the present invention may be any polyol that is commonly used in the production of a polyurethane. Examples thereof include a polyester polyol, a polycaprolactone polyol, a polycarbonate polyol, and a polyether polyol. Among these, a polyether polyol is preferable. In particular, polytetramethylene ether glycol, which enables the production of a urethane having physical properties analogous to those of a urethane produced using the PEPCD, is preferable.

The ratio of the weight of the PEPCD according to the present invention to the total weight of the PEPCD according to the present invention and the other polyol is preferably 30% or more, is more preferably 50% or more, and is further preferably 90% or more. When the weight ratio of the PEPCD according to the present invention is equal to or more than the above lower limit, the urethane polymerization reaction can be easily controlled and the resulting polyurethane has suitable flexibility.

<Method for Producing Polyurethane>

For producing the polyurethane according to the present invention using the above-described reagents, various experimental and industrial production methods commonly used in the related art can be used.

Examples thereof include a method in which the PEPCD according to the present invention, the other polyol used as needed, the polyisocyanate compound, and the chain extender are mixed and reacted with one another at a time (hereinafter, this method may be referred to as "one-step method"); and a method in which the PEPCD according to the present invention, the other polyol used as needed, and the polyisocyanate compound are reacted with one another in order to prepare a prepolymer including two isocyanate groups at respective terminals and the prepolymer is subsequently reacted with the chain extender (hereinafter, this method may be referred to as "two-step method").

The two-step method includes a step of reacting the PEPCD according to the present invention and the other polyol with one equivalent or more of the polyisocyanate compound to prepare an intermediate including two isocyanate groups at the respective terminals, which is a part corresponding to the soft segment of polyurethane. When the above prepolymer is prepared first and subsequently reacted with the chain extender, the molecular weight of the soft segment portion may be readily adjusted. The two-step method is useful in the case where the phase separation between the soft and hard segments needs to be performed with certainty.

(One-Step Method)

The one-step method, which is referred to also as "one-shot method", is a method in which the PEPCD according to the present invention, the other polyol, the polyisocyanate compound, and the chain extender are charged at a time to cause a reaction.

Although the amount of the polyisocyanate compound used in the one-step method is not limited, when the total of the total number of hydroxyl groups included in the PEPCD according to the present invention and the other polyol and the number of hydroxyl and amino groups included in the chain extender is defined as 1 equivalent, the lower limit for the amount of the polyisocyanate compound used is preferably 0.7 equivalents, is more preferably 0.8 equivalents, is further preferably 0.9 equivalents, and is particularly preferably 0.95 equivalents, and the upper limit for the above amount is preferably 3.0 equivalents, is more preferably 2.0 equivalents, is further preferably 1.5 equivalents, and is particularly preferably 1.1 equivalents.

Setting the amount of the polyisocyanate compound used to be equal to or less than the upper limit avoids a side reaction of unreacted isocyanate groups and consequently prevents an excessive increase in the viscosity of the resulting polyurethane, a reduction in ease of handling, and degradation of flexibility. When the amount of the polyisocyanate compound used is equal to or more than the lower limit, the resulting polyurethane may have a sufficiently high molecular weight and a sufficiently high strength.

The amount of the chain extender used is not limited. When the number of isocyanate groups included in the polyisocyanate compound subtracted by the total number of hydroxyl groups included in the PEPCD according to the present invention and the other polyol is defined as 1 equivalent, the lower limit for the amount of the chain extender is preferably 0.7 equivalents, is more preferably 0.8 equivalents, is further preferably 0.9 equivalents, and is particularly preferably 0.95 equivalents, and the upper limit for the above amount is preferably 3.0 equivalents, is more preferably 2.0 equivalents, is further preferably 1.5 equivalents, and is particularly preferably 1.1 equivalents. When the amount of the chain extender is equal to or less than the upper limit, the resulting polyurethane may be readily soluble in solvents and workability may be increased. When the amount of the chain extender is equal to or more than the lower limit, the hardness of the resulting polyurethane is not reduced to an excessive degree and the polyurethane is likely to have sufficient degrees of strength, hardness, elastic recoverability, and elasticity retention capacity. In addition, the polyurethane has suitable heat resistance.

(Two-Step Method)

Common examples of the two-step method, which is referred to also as "prepolymer method", include the following methods.

(a) A certain amount of the PEPCD according to the present invention, a certain amount of the other polyol, and an excessive amount of the polyisocyanate compound are reacted with one another such that the reaction equivalent ratio of Polyisocyanate compound/(PEPCD according to the present invention and the other polyol) is more than 1 and 10.0 or less in order to produce a prepolymer including isocyanate groups at the respective terminals of the molecular chain. Subsequently, the chain extender is added to the prepolymer in order to produce a polyurethane.

(b) A certain amount of the polyisocyanate compound and excessive amounts of the PEPCD according to the present invention and the other polyol are reacted with one another such that the reaction equivalent ratio of Polyisocyanate compound/(PEPCD according to the present invention and the other polyol) is 0.1 or more and less than 1.0 to produce a prepolymer including hydroxyl groups at the respective terminals of the molecular chain. Subsequently, the prepolymer is reacted with a chain extender that is a polyisocyanate compound including isocyanate groups at the respective terminals to produce a polyurethane.

The two-step method can be conducted in the absence or presence of a solvent.

Production of the polyurethane by the two-step method can be achieved by any one of the methods (1) to (3) below.

(1) In the absence of a solvent, the polyisocyanate compound, the PEPCD according to the present invention, and the other polyol are reacted with one another directly in order to synthesis a prepolymer, which is directly used for the chain extension reaction.

(2) A prepolymer is synthesized by the method (1) and subsequently dissolved in a solvent. The resulting solution is used for the subsequent chain extension reaction.

(3) The polyisocyanate compound, the PEPCD according to the present invention, and the other polyol are reacted with one another using a solvent. Subsequently, the chain extension reaction is conducted.

In the case where the method (1) is used, it is important to produce the polyurethane in coexistence with a solvent by, for example, dissolving the chain extender in a solvent or by dissolving the prepolymer and the chain extender in a solvent simultaneously, prior to the chain extension reaction.

The amount of the polyisocyanate compound used in the two-step method (a) is not limited. When the total number of all hydroxyl groups included in the PEPCD according to the present invention and the other polyol is defined as 1 equivalent, the lower limit for the number of isocyanate groups is preferably more than 1.0 equivalents, is more preferably 1.2 equivalents, and is further preferably 1.5 equivalents, and the upper limit for the number of isocyanate groups is preferably 10.0 equivalents, is more preferably 5.0 equivalents, and is further preferably 3.0 equivalents.

When the amount of the polyisocyanate compound used is equal to or less than the upper limit, the side reaction caused by excess isocyanate groups is reduced and, consequently, intended physical properties of the polyurethane may be achieved. When the amount of the polyisocyanate compound used is equal to or more than the lower limit, the resulting polyurethane has a sufficiently high molecular weight, a high strength, and high thermal stability.

The amount of the chain extender used is not limited. When the number of isocyanate groups included in the prepolymer is defined as 1 equivalent, the lower limit for the amount of the above chain extender is preferably 0.1 equivalents, is more preferably 0.5 equivalents, and is further preferably 0.8 equivalents, and the upper limit for the amount of the above chain extender is preferably 5.0 equivalents, is more preferably 3.0 equivalents, and is further preferably 2.0 equivalents.

In the chain extension reaction, a monofunctional organic amine or alcohol may be used in a coexistent manner in order to adjust molecular weight.

The amount of the polyisocyanate compound used when the prepolymer including hydroxyl groups at the respective terminals is prepared by the two-step method (b) is not limited. When the total number of all hydroxyl groups included in the PEPCD according to the present invention and the other polyol is defined as 1 equivalent, the lower limit for the number of isocyanate groups is preferably 0.1 equivalents, is more preferably 0.5 equivalents, and is further preferably 0.7 equivalents, and the upper limit for the number of isocyanate groups is preferably 0.99 equivalents, is more preferably 0.98 equivalents, and is further preferably 0.97 equivalents.

Setting the amount of the polyisocyanate compound used to be equal to or more than the lower limit prevents an excessive increase in the amount of time required for conducting the subsequent chain extension reaction until an intended molecular weight is achieved and may consequently increase the production efficiency. Setting the amount of the polyisocyanate compound used to be equal to or less than the upper limit prevents an excessive increase in viscosity and thereby limits reductions in the flexibility, ease of handling, and productivity of the resulting polyurethane.

The amount of the chain extender is not limited. When the total number of all hydroxyl groups included in the PEPCD according to the present invention and the other polyol that are used for producing the prepolymer is defined as 1 equivalent, the lower limit for the total equivalent including the isocyanate groups used for preparing the prepolymer is preferably 0.7 equivalents, is more preferably 0.8 equivalents, and is further preferably 0.9 equivalents, and the upper limit for the above total equivalent is preferably less than 1.0 equivalents, is more preferably 0.99 equivalents, and is further preferably 0.98 equivalents.

In the chain extension reaction, a monofunctional organic amine or alcohol may be used in a coexistent manner in order to adjust molecular weight.

The chain extension reaction is commonly conducted at 0° C. to 250° C. The temperature at which the chain extension reaction is conducted is not limited and varies depending on the amount of the solvent used, the reactivity of the raw material used, the facility used for conducting the reaction, and the like. When the chain extension reaction is conducted at a temperature equal to or more than the lower limit, the reaction rate and the solubility of raw materials and polymers are high. This reduces the amount of time required by production. When the chain extension reaction is conducted at a temperature equal to or less than the upper limit, a side reaction and the decomposition of the resulting polyurethane can be reduced. The chain extension reaction may be conducted at reduced pressure while degassing is performed.

In the chain extension reaction, a catalyst, a stabilizer, and the like may be used as needed.

Examples of the catalyst include the following compounds: triethylamine, tributylamine, dibutyltin dilaurate, stannous octoate, acetic acid, phosphoric acid, sulfuric acid, hydrochloric acid, and sulfonic acid. The above catalysts may be used alone or in combination of two or more.

Examples of the stabilizer include the following compounds: 2,6-dibutyl-4-methylphenol, distearyl thiodipropionate, N,N'-di-2-naphthyl-1,4-phenylenediamine, and tris(dinonylphenyl) phosphite. The above stabilizers may be used alone or in combination of two or more.

In the case where a chain extender having high reactivity, such as a short-chain aliphatic amine, is used, the chain extension reaction may be conducted without using a catalyst.

Optionally, a reaction inhibitor, such as tris(2-ethylhexyl) phosphite, may be used.

<Additive>

Various additives, such as a heat stabilizer, a light stabilizer, a colorant, a filler, a stabilizer, an ultraviolet absorber, an antioxidant, an antitack agent, a flame retardant, an age resistor, and an inorganic filler, may be added to and mixed with the polyurethane according to the present invention such that the properties of the polyurethane according to the present invention are not impaired.

Examples of compounds that can be used as a heat stabilizer include phosphorus compounds, such as aliphatic, aromatic, and alkyl group-substituted aromatic esters of phosphoric acid and phosphorous acid, a hypophosphorous acid derivative, phenylphosphonic acid, phenylphosphinic acid, diphenylphosphonic acid, polyphosphonate, dialkyl pentaerythritol diphosphite, and dialkyl bisphenol A diphosphite; phenol derivatives and, in particular, hindered phenolic compounds; sulfur-containing compounds, such as a thioether, a dithioate salt, a mercaptobenzimidazole, a thiocarbanilide, and a thiodipropionic ester; and tin compounds, such as tin maleate and dibutyltin monoxide.

Specific examples of the hindered phenolic compounds include “Irganox1010” (product name: produced by BASF Japan), “Irganox1520” (product name: produced by BASF Japan), and “Irganox245” (product name: produced by BASF Japan).

Examples of the phosphorus compounds include “PEP-36”, “PEP-24G”, and “HP-10” (the above are all product names: produced by ADEKA CORPORATION) and “Irgafos 168” (product name: produced by BASF Japan).

Specific examples of the sulfur-containing compounds include thioether compounds, such as dilauryl thiopropionate (DLTP) and distearyl thiopropionate (DSTP).

Examples of the light stabilizer include benzotriazole compounds and benzophenone compounds. Specific examples thereof include “TINUVIN622LD” and “TINUVIN765” (the above are produced by Ciba Specialty Chemicals); and “SANOL LS-2626” and “SANOL LS-765” (the above are produced by Sankyo Co., Ltd.).

Examples of the ultraviolet absorber include “TINUVIN328” and “TINUVIN234” (the above are produced by Ciba Specialty Chemicals).

Examples of the colorant include dyes, such as a direct dye, an acidic dye, a basic dye, and a metal-complex dye; inorganic pigments, such as carbon black, titanium oxide, zinc oxide, iron oxide, and mica; and organic pigments, such as a coupling azo pigment, a condensed azo pigment, an anthraquinone pigment, a thioindigo pigment, a dioxazone pigment, and a phthalocyanine pigment.

Examples of the inorganic filler include short glass fibers, carbon fibers, alumina, talc, graphite, melamine, and white clay.

Examples of the flame retardant include addition-type and reaction-type flame retardants, such as phosphorus- or halogen-containing organic compounds, a bromine- or chlorine-containing organic compound, ammonium polyphosphate, aluminum hydroxide, and antimony oxide.

The above additives may be used alone, or any two or more of the above additives may be used in combination at any ratio.

The lower limit for the weight ratio of the additives used to the polyurethane is preferably 0.01% by weight, is more preferably 0.05% by weight, and is further preferably 0.1% by weight, and the upper limit for the above weight ratio is preferably 10% by weight, is more preferably 5% by weight, and is further preferably 1% by weight. When the amount of the additives used is equal to or more than the lower limit, the advantageous effects of addition of the additives can be achieved to a sufficient degree. When the amount of the additives used is equal to or less than the upper limit, the risk of the additives precipitating in the polyurethane or making the polyurethane cloudy can be eliminated.

<Molecular Weight of Polyurethane>

The molecular weight of the polyurethane according to the present invention is not limited and may be adjusted appropriately in accordance with the application. The weight-average molecular weight (Mw) of the polyurethane according to the present invention which is determined by GPC in terms of polystyrene equivalent weight is preferably 50,000 to 400,000 and is more preferably 100,000 to 300,000. When the Mw is equal to or more than the lower limit, a sufficiently high strength and sufficiently high hardness can be achieved. When the Mw is equal to or less than the upper limit, ease of handling, such as workability, may be markedly increased.

<Application of Polyurethane>

Since the polyurethane according to the present invention has excellent resistance to solvents, suitable flexibility, and a suitable mechanical strength, it can be widely used for producing a foam, an elastomer, an elastic fiber, a paint, a fiber, a pressure-sensitive adhesive, an adhesive, a floor covering material, a sealant, a medical material, an artificial leather, a synthetic leather, a coating agent, an aqueous polyurethane paint, an active energy ray curable polymer composition, and the like.

In particular, when the polyurethane according to the present invention is used for producing an artificial leather, a synthetic leather, a breathable-waterproof fabric, a waterproof fabric, an aqueous polyurethane, an adhesive, an elastic fiber, a medical material, a floor covering material, a paint, a coating agent, or the like, suitable resistance to solvents, suitable flexibility, and a suitable mechanical strength are achieved in a balanced manner, and the following suitable properties can be imparted to the product: portions of the product which come into contact with human skin or in which a cosmetic chemical or alcohol for sterilization is used have high durability; and the product has sufficient flexibility and high resistance to physical impact and the like. The polyurethane according to the present invention can be suitably used in automotive applications, where certain heat resistance is required, and in outdoor applications, where certain weather resistance is required.

The polyurethane according to the present invention can be used as a polyurethane elastomer, such as a cast polyurethane elastomer. Specific examples of application thereof include rollers, such as a reduction roller, a papermaking roller, an office machine, and a pretensioning roller; solid tires and casters for forklifts, automobile Newtram, flatcars, trucks, and the like; and industrial products, such as a conveyer belt idler, a guide roller, a pulley, a steel pipe liner, a rubber screen for ores, a gear, a connection ring, a liner, a pump impeller, a cyclone corn, and a cyclone liner. The polyurethane according to the present invention may also be used for producing a belt for office automation equipment, a paper feed roller, a cleaning blade for copying machines, a snowplow, a toothed belt, a surf roller, and the like.

The polyurethane according to the present invention may also be used as a thermoplastic elastomer. For example, such a thermoplastic elastomer may be used in the production of tubes and hoses included in a pneumatic component used in the fields of food and medicine, a coating apparatus, an analytical instrument, a physical and chemical appliance, a metering pump, a water treatment instrument, an industrial robot, and the like, a spiral tube, a fire hose, and the like. In another case, the thermoplastic elastomer may be used in the production of belts, such as a round belt, a V-belt, and a flat belt, included in various driving mechanisms, spinning machinery, a packing machine, a printing machine, and the like. The thermoplastic elastomer may also be used in the production of a shoe heel top, a shoe sole, machine components, such as a coupling, a packing, a pole joint, a bushing, a gear, and a roller, sporting and leisure goods, a watch strap, and the like. The thermoplastic elastomer may also be used in the production of automotive components, such as an oil stopper, a gear box, a spacer, a chassis component, an interior part, and a tire chain alternative. The thermoplastic elastomer may also be used in the production of films, such as a keyboard film and an automotive film, a curl cord, a cable sheath, bellows, a transport belt, a flexible container, a binder, a synthetic leather, a dipping product, an adhesive, and the like.

The polyurethane elastomer produced using the polyurethane according to the present invention may be formed into a foamed polyurethane elastomer or a polyurethane foam. The polyurethane elastomer may be foamed or formed into a polyurethane foam by either of the following methods: chemical foaming using water or the like; and mechanical foaming, such as mechanical flossing. Other examples thereof include a rigid foam produced by spray foaming, slab foaming, injection foaming, or mold foaming and a flexible foam produced by slab foaming or mold foaming.

Specific examples of application of the foamed polyurethane elastomer or the polyurethane foam include thermal insulators and isolators for electronic devices, railroad rails, and buildings, automotive seats, automotive ceiling cushions, beddings, such as a mattress, insoles, midsoles, and shoe soles.

The polyurethane according to the present invention can be used for producing solvent-based two-component paints. For example, the polyurethane according to the present invention can be applied to wood products, such as a musical instrument, a Buddhist altar, furniture, a decorative plywood, and sports goods. The polyurethane according to the present invention may be formed into a coal tar epoxy urethane and used for automotive refinishing.

The polyurethane according to the present invention can be used as a component of a moisture-curable one-component paint, a blocked isocyanate solvent paint, an alkyd plastic paint, a urethane-modified synthetic resin paint, a ultraviolet curable paint, an aqueous urethane paint, or the like. For example, the polyurethane according to the present invention can be used for producing paints for plastic bumpers, strippable paints, coating agents for magnetic tapes, overprint varnishes for floor tiles, floor covering materials, paper, woodgrain printed films, and the like, wood varnishes, high-processing coil coatings, optical fiber protection coatings, solder resist, top coatings for metal printing, base coatings for vapor deposition, white coatings for food cans, and the like.

The polyurethane according to the present invention can be used, as a pressure-sensitive adhesive or an adhesive, for producing food packages, shoes, footwear, magnetic tape binders, decorative paper, lumber, structural members, and the like. The polyurethane according to the present invention can also be used as a component of a low-temperature adhesive or a hot-melt adhesive.

The polyurethane according to the present invention can be used, as a binder, in the production of magnetic recording media, inks, castings, burned bricks, graft materials, microcapsules, granular fertilizers, granular agricultural chemicals, polymer cement mortar, resin mortar, rubber chip binder, regenerated foams, glass fiber sizing, and the like.

The polyurethane according to the present invention can be used, as a component of a textile-processing agent, for shrink resistant finishing, crease resistant finishing, water repellent finishing, and the like.

In the case where the polyurethane according to the present invention is used in the form of elastic fibers, the method for producing elastic fibers from the polyurethane is not limited; any spinning method may be used. For example, a melt spinning method, in which the polyurethane is formed into pellets and then melted and the molten polyurethane is directly spun through a spinning nozzle, can be used. In the case where elastic fibers are produced from the polyurethane according to the present invention by melt spinning, the spinning temperature is preferably 250° C. or less and is more preferably 200° C. or more and 235° C. or less.

The elastic fibers formed of the polyurethane according to the present invention may be used directly as bare threads or may be covered with other fibers to form covered threads. Examples of the other fibers include the fibers known in the related art, such as polyamide fibers, wool, cotton, and polyester fibers. Among these, polyester fibers are preferably used. The elastic fibers formed of the polyurethane according to the present invention may include a disperse dye having a dyeing power.

The polyurethane according to the present invention can be used, as a sealant or caulk, for producing concrete walls, joints of causing crack, surroundings of sash, wall-type PC (precast concrete) joints, ALC (autoclaved light-weight concrete) joints, joints of boards, sealants for composite glass, sealants for heat insulating sash, automotive sealants, rooftop waterproofing sheets, and the like.

The polyurethane according to the present invention can be used as a medical material. For example, the polyurethane according to the present invention can be used, as a blood-compatible material, a tube, a catheter, an artificial heart, an artificial vessel, an artificial valve, and the like and, as a disposable material, a catheter, a tube, a bag, surgical gloves, an artificial kidney potting material, and the like.

After the terminals of the polyurethane according to the present invention have been modified, the polyurethane can be used as a raw material for UV curable paints, electron beam-curable paints, photosensitive resin compositions for flexographic plates, photo-curing optical fiber covering material compositions, and the like.

[Applications of Polyurethane]

Details of each of the applications of the polyurethane according to the present invention are described below.

<Breathable-Waterproof Film, Membrane, and Fabric>

A polyurethane produced using the PEPCD according to the present invention can be used as a breathable-waterproof film having excellent performance. While polyester polyols and polyether polyols have been primarily used as a raw material for breathable-waterproof polyurethanes, a polyester polyol suffers a fatal flaw in that it has poor hydrolysis resistance. On the other hand, a urethane produced using a polyether polyol has poor lightfastness and poor heat resistance. Recently, there has been devised a polyurethane for breathable-waterproof fabric which is produced using a polycarbonate diol (PCD) or an ester-modified polycarbonate diol in order to enhance durability such as hydrolysis resistance. However, while a breathable-waterproof fabric produced using a polycarbonate diol may have moisture permeability by forming micropores in the fabric by a wet process, it is not possible to achieve sufficient moisture permeability in the case where a breathable-waterproof film is formed. Therefore, in some cases, polyethylene glycol (PEG) and polycarbonate diol are used in a mixture. However, this results in poor miscibility, insufficient strength, poor adhesiveness, poor feeling, and the like.

Since the PEPCD is constituted by ether linkages and carbonate linkages, the oxygen content is high and sufficient moisture permeability can be achieved even in the case where pores are not formed. That is, the PEPCD is a polyol that has suitable moisture permeability similar to that of PEG and suitable durability similar to that of PCD. Accordingly, a water-resistant pressure of 10,000 mm or more and, furthermore, a water-resistant pressure of 20,000 mm or more can be achieved. In addition, a moisture permeability of 10,000 $g/m^2$-24 hrs or more and, furthermore, a moisture permeability of 15,000 $g/m^2$-24 hrs or more can be achieved.

[0141]

Since the PEPCD includes a carbonate linkage and is capable of achieving a sufficient strength and a sufficient water-resistant pressure, it is possible to form pores. In the case where pores are formed, moisture permeability can be further enhanced and a water-resistant pressure of 10,000 mm or more and, furthermore, a water-resistant pressure of 20,000 mm or more can be achieved even when the thickness is increased. Moreover, a moisture permeability of 10,000 $g/m^2$-24 hrs or more and, furthermore, a moisture permeability of 15,000 $g/m^2$-24 hrs or more can be achieved.

The method for forming the breathable-waterproof coating film is not limited. An example of the method for producing a nonporous coating film is as follows. The surface of a release paper is coated with a surface skin layer-forming polyurethane solution that includes an anti-blocking agent and a pigment in order to prevent films from adhering to each other. The deposited solution is dried to form a film. The film is coated with an adhesive layer-forming polyurethane solution including a polyurethane, a crosslinking agent, a solvent, a catalyst, and the like. The resulting multilayer body is bonded to a base material by pressure bonding. The solvent included in the adhesive layer is volatilized with a dryer. Subsequently, aging is performed to complete the curing reaction. Then, the release paper is removed. Hereby, a nonporous breathable-waterproof fabric is formed.

A polyurethane produced using the PEPCD according to the present invention can also be used for coating a porous breathable-waterproof fabric. An example of a method for producing a porous coating film is as follows. A base material that has been subjected to a pretreatment in order to prevent a solution from entering the base material more than necessary is coated with a surface skin layer-forming polyurethane solution and then immersed in a coagulation bath. During the immersion, the solvent included in the polyurethane solution is extracted and the resin becomes precipitated and solidified. As a result, a porous polyurethane layer having a number of voids is formed. Subsequently, drying is performed. Hereby, a microporous membrane-like breathable-waterproof fabric is produced. Since the PEPCD includes carbonate linkages and ether linkages in a balanced manner, it has adequate hydrophilicity and flexibility and enables the production of a breathable-waterproof fabric excellent in terms of the comfort felt when wearing the fabric in addition to breathable-waterproof performance.

The breathable-waterproof fabric produced using the PEPCD according to the present invention can be suitably used for producing outdoor rainwear, windbreakers, cold weather gear, shoes, tents, rucksacks, bags, shoes, and the like.

<Cellulose Nanofiber Treating Agent>

The polyurethane produced using the PEPCD according to the present invention can be used as an agent for treating cellulose nanofibers.

Cellulose nanofibers (CNF) are ultrathin fibrous substance having a diameter of 3 to 50 nm and an aspect ratio (fiber length/fiber width) of 100 or more and produced by refining vegetable fibers derived from wood and bamboo with various methods. CNF has the following advantages: low weight (specific gravity: 1.3 to 1.5 $g/cm^3$, which is about 1/5 of that of steel), high strength (strength: 3 GPa, which is about 5 times that of steel), large specific surface area (250 $m^2/g$ or more), high adsorption property, high hardness (tensile modulus of elasticity: about 140 GPa, which is comparable to that of aramid fibers), low thermal expansion and contraction (coefficient of linear expansion: 0.1 to 0.2 ppm/K, which is about 1/50 of that of glass), high thermal conductivity comparable to that of glass, excellent biocompatibility, and the like. CNF is a markedly promising material used as a filler for reinforcing various types of plastics. However, it has been difficult to knead CNF having strong hydrophilicity with a plastic that is commonly hydrophobic. This has been a great issue to be dissolved for proliferation.

When the concentration of ether linkages in the polyol is controlled, the polyurethane produced using the PEPCD according to the present invention is a polymer having adequate hydrophilicity and can be adsorbed onto the surface of CNF in the form of a polyurethane emulsion. This converts the polarity of the surface of CNF into hydrophobic and enables the CNF to be kneaded with a hydrophobic general-purpose resin, such as polypropylene, polyethylene, PET, PBT, polycarbonate, or polyamide. The CNF finely and uniformly dispersed in the resin forms a strong network, which exhibits a reinforcing effect with efficiency, increases strength and modulus of elasticity, and markedly reduces coefficient of linear expansion.

<Paint for Automotive Interiors>

The polyurethane produced using the PEPCD according to the present invention can be used for producing a paint for automotive interiors.

Large plastic components included in the automotive interiors are commonly coated with a paint in order to enhance graphical design function while hiding molding defects and protecting the components. Since it is supposed that the components are touched by human hand and exposed to strong direct sunlight during the use, high lightfastness, high heat resistance, high chemical resistance, and high scratch resistance are required. Furthermore, suitable feeling and high level of graphical design function are required. In addition, in order to increase productivity and save energy, certain curability with which curing occurs when dried in a short time at low temperature is required.

When the concentration of carbonate linkages and ether linkages, molecular weight, and the number of functional groups are controlled, the polyurethane produced using the PEPCD according to the present invention has high durability and excellent feeling. Since the polyurethane produced using the PEPCD according to the present invention has low adhesion, the tack-free time is short and curing can be performed at low temperatures. Moreover, since the compression set is small, a self-cure coating film, in which scratches made by nail or the like can be spontaneously recovered, can be formed. Therefore, the polyurethane produced using the PEPCD according to the present invention can be used as a main agent of a paint for automotive interior components, such as an instrumental panel and a center console.

<Paint for Housings of Home Appliances>

The polyurethane produced using the PEPCD according to the present invention can be used for producing a paint for housings of home appliances.

Plastic housings of home appliances may be coated with a paint in order to enhance an antiglare property, an antifouling property, protective performance, feeling, and graphical design function. The coating film is required to have adhesiveness to a base material composed of polystyrene, ABS, polycarbonate, or the like. The coating film is also required to have chemical resistance to acids, alkalis, fats, and the like, ease of spray painting, ease of drying at low temperatures, and resistance to scratch made by packing materials during transportation.

When the concentration of carbonate linkages and ether linkages is controlled, molecular weight and the number of functional groups are adjusted, an appropriate diisocyanate and an appropriate chain extender are selected, and the content of the hard segment and molecular weight are adjusted, the polyurethane produced using the PEPCD according to the present invention enables excellent chemical resistance, excellent adhesiveness, and excellent scratch resistance to be achieved and can be used as a main agent of the paint for housings of home appliances.

<Gravure Ink>

The polyurethane produced using the PEPCD according to the present invention can be used for producing gravure inks.

Gravure inks are widely used for producing films for food packages, wall papers for building materials, decorative sheets, and the like because they enable high-speed printing of long-length films and paper sheets and formation of multicolor, high-definition printed matter. Gravure inks for packages are required to have a high level of printability. In particular, there are strict demands for re-solubility of ink and resistance to acid, alkaline, and oil subsequent to printing.

The polyurethane produced using the PEPCD according to the present invention can be used as a binder resin included in gravure inks for packages because of durability resulting from polycarbonate and solubility resulting from the adjustment of ether linkage concentration.

Gravure inks for building materials are required to have weather resistance, stain resistance, and blocking resistance with which the likelihood of blocking occurring when winding is performed in printing can be reduced. The polyurethane produced using the PEPCD according to the present invention has high weather resistance resulting from polycarbonate. Furthermore, the polyurethane has high re-solubility when the number of the functional groups is controlled and the concentration of ether linkages is optimized. Moreover, blocking onto the rear surfaces of the films is reduced when the concentrations of urethane linkages and urea linkages derived from a diamine chain extender are controlled. Thus, the polyurethane produced using the PEPCD according to the present invention can be used as a binder resin included in gravure inks for various films for building materials.

<Paint for Building Exteriors>

The polyurethane produced using the PEPCD according to the present invention can be used for producing paints for building exteriors.

Paints for building exteriors are required to have a high-gloss appearance, stain resistance, and high weather resistance with which the paints can withstand wind, rain, and solar radiation over a long period of time. On the other hand, there has been a shift from conventional solvent-based paints to mildly-irritating, weak-solvent-based paints. There has also been a shift to aqueous paints, which are further friendly to the environment. As a result of the shift to aqueous paints, it is becoming difficult to maintain the above required performance.

When the concentrations of carbonate linkages and ether linkages are controlled to optimize hydrophilicity, the polyurethane produced using the PEPCD according to the present invention enables formation of an emulsion having a small particle size. Consequently, when an aqueous paint is prepared, a coating film having small surface irregularities, that is, a high-gloss appearance, can be formed. Furthermore, since the polyurethane produced using the PEPCD according to the present invention has high weather resistance resulting from polycarbonate, it is most suitable as a resin included in paints for building exteriors. When the hydrophilicity of the surface of the coating film is enhanced to the maximum degree, a low-contamination coating film that reduces adhesion of lipophilic contaminants and increases ease of cleaning may be formed.

<Rooftop Waterproofing>

The polyurethane produced using the PEPCD according to the present invention can be used for rooftop waterproofing.

Rooftop waterproofing treatments are classified into sheet waterproofing and coating waterproofing. Cured coating films produced by aromatic diamine crosslinking of a prepolymer produced from a polypropylene glycol and a diisocyanate have been widely used in coating waterproofing. Although the above coating films are easy to construct compared with sheet waterproofing, they have poor weather resistance and a short service life, which is about 10 years, that is, about half the service life of sheet waterproofing.

Since the polyurethane produced using the PEPCD according to the present invention has high weather resistance resulting from polycarbonate and high waterproof performance as a result of appropriately controlling the concentration of ether linkages and adjusting the number of the functional groups, it can be used as a main agent for rooftop coating waterproofing materials having a long service life.

<Sealant for Information Electronic Materials>

The polyurethane produced using the PEPCD according to the present invention can be used as a sealant for information electronic materials.

Various sealants have been used in each of the fields of information electronic materials in order to protect various types of functional elements from the environment. These sealants are required to have a barrier property, heat resistance, hydrolysis resistance, clarity, lightfastness, adhesiveness, flexibility, mechanical strength, and the like.

Since the polyurethane produced using the PEPCD according to the present invention has high weather resistance resulting from polycarbonate, a high barrier property against oxygen and water vapor as a result of controlling the concentration of polyether linkages and the number of the functional groups, and the other required properties in a balanced manner as a result of adjusting the types of diisocyanate and chain extender and the content of the hard segment, it can be used as a resin included in sealants used in the production of light-emitting elements included in flat-panel displays, solar battery panels, and the like.

<Ultralow Hardness Low-Compression Set Non-Foam Resin>

The polyurethane produced using the PEPCD according to the present invention can be used for producing ultralow hardness low-compression set non-foam resins.

For achieving low hardness, it is necessary to increase molecular weight between crosslinks and introduce a flexible ether structure in order to increase the flexibility of the molecular chain. For achieving low compression strain, it is necessary to increase the number of the functional groups and minimize the number of deficits of the crosslinked structure. It is not possible to use PEG, PTMG, and PPG for the above purpose for the following reasons: PEG does not have sufficient mechanical properties; it is difficult to produce multifunctional PTMG; PPG, which includes a terminal OH group bonded to a secondary carbon atom, has low reactivity and is disadvantageously converted into an olefin at a certain ratio as a result of dehydration.

Since the PEPCD according to the present invention always includes a terminal OH group bonded to a primary carbon atom having high reactivity as long as a multifunctional alcohol including an OH group bonded to a primary carbon atom is used as a raw material, it is possible to produce a polyurethane having a perfect crosslinked structure and a high molecular weight between crosslinks. Furthermore, since the polyurethane produced using the PEPCD according to the present invention has high weather resistance resulting from polycarbonate, a non-foam molded product having high durability in addition to flexibility and compression set comparable to those of a foam can be produced. The non-foam molded product can be effectively used as a material for various types of special rollers included in printing machines and copying machines.

<Polyurethane Flexible Foam>

The polyurethane produced using the PEPCD according to the present invention can be used for producing flexible polyurethane foams.

For achieving low hardness, it is necessary to increase molecular weight between crosslinks and introduce a flexible ether structure in order to increase the flexibility of the molecular chain. For achieving low compression strain, it is necessary to increase the number of the functional groups and minimize the number of deficits of the crosslinked structure. It is not possible to use PEG, PTMG, and PPG for the above purpose for the following reasons: PEG does not have sufficient mechanical properties; it is difficult to produce multifunctional PTMG; PPG, which includes a terminal OH group bonded to a secondary carbon atom, has low reactivity and is disadvantageously converted into an olefin at a certain ratio as a result of dehydration.

Since the PEPCD according to the present invention always includes a terminal OH group bonded to a primary carbon atom having high reactivity as long as a multifunctional alcohol including an OH group bonded to a primary carbon atom is used as a raw material, it is possible to produce a polyurethane having a perfect crosslinked structure and a high molecular weight between crosslinks. Furthermore, since the polyurethane produced using the PEPCD according to the present invention has high weather resistance resulting from polycarbonate, a foam molded product having high durability, flexibility, low compression set, and high rebound resilience can be produced. This molded product can be effectively used as a material for various types of special rollers included in printing machines and copying machines, shoe soles, urethane bats, and sleepers and vibration isolators for railroad rails. In particular, a high-density foam having a foam density of 0.1 g/cc or more is excellent in terms of the above-described properties.

[Urethane (Meth)acrylate Resin]

A urethane (meth)acrylate oligomer (hereinafter, may be referred to as "urethane (meth)acrylate oligomer according to the present invention") can be produced by addition reaction of the PEPCD according to the present invention with a polyisocyanate and a hydroxyalkyl (meth)acrylate. In the case where other raw material compounds, such as a polyol and a chain extender, are used in combination with the above materials, the urethane (meth)acrylate oligomer can be produced by addition reaction of the polyisocyanate with the other raw material compounds. An active energy ray-curable resin composition can be produced by mixing the urethane (meth)acrylate according to the present invention with other raw materials. This active energy ray-curable resin composition can be widely used for various surface treatments and production of cast molded products. When the active energy ray-curable resin composition is cured to form a cured film, the cured film has certain hardness and certain elongation in a balanced manner and is excellent in terms of resistance to solvents and ease of handling. The active energy ray-curable resin composition can be used as a raw material for UV curable paints, electron beam-curable paints, photosensitive resin compositions for flexographic plates, and photo-curing optical fiber covering material compositions, and the like.

The urethane (meth)acrylate oligomer according to the present invention can be produced by using, in addition to the PEPCD according to the present invention, a polyisocyanate, a hydroxyalkyl (meth)acrylate, and other compounds as needed. Examples of the polyisocyanate that can be used in the production of the urethane (meth)acrylate oligomer include the above-described organic diisocyanates and polyisocyanates, such as tris(isocyanatohexyl)isocyanurate.

The hydroxyalkyl (meth)acrylate that can be used in the production of the urethane (meth)acrylate oligomer is not limited and may be any compound having one or more hydroxyl groups and one or more (meth)acryloyl groups, such as 2-hydroxyethyl (meth)acrylate. The PEPCD according to the present invention may be used in combination with a compound having at least two active hydrogen atoms, such as a polyol and/or a polyamine, as needed. The above compounds may be used in any combination.

The active energy ray-curable resin composition including the urethane (meth)acrylate oligomer according to the present invention may be mixed with an active energy ray-reactive monomer other than the urethane (meth)acrylate oligomer according to the present invention, an active energy ray-curable oligomer, a polymerization initiator, a photosensitizer, additives other than the above materials, and the like.

A cured film formed of the active energy ray-curable resin composition including the urethane (meth)acrylate oligomer according to the present invention can be a film excellent in terms of stain resistance and protective performance against general household contaminants, such as inks and ethanol.

Multilayer bodies produced by coating various types of base materials with the cured film are excellent in terms of graphical design function and surface protective performance and can be used as a film alternative to coating. Such a film can be effectively applied to, for example, interior and exterior building materials and various members included in automobiles, home appliances, and the like.

[Applications of Polyester Elastomer]

The PEPCD according to the present invention can be used as a polyester elastomer.

A polyester elastomer is a copolymer constituted by a hard segment composed primarily of an aromatic polyester and a soft segment composed primarily of an aliphatic polyether, an aliphatic polyester, or an aliphatic polycarbonate. When the PEPCD according to the present invention is used as a component constituting the soft segment of the polyester elastomer, excellent physical properties, such as heat resistance and water resistance, can be achieved compared with the cases where an aliphatic polyether and an aliphatic polyester are used. Furthermore, the resulting polyether carbonate ester elastomer has suitable flowability during melting, that is, a melt flow rate suitable for blow molding and extrusion molding, and achieves suitable mechanical strength and other physical properties in a balanced manner compared with publicly known polycarbonate polyols. The polyether carbonate ester elastomer can be suitably used as various types of molding materials, such as a fiber, a film, and a sheet, that is, for example, molding materials for elastic yarn, boots, gears, tubes, packings, and the like. Specifically, the polyether carbonate ester elastomer can be effectively used for producing joint boots included in automotive and home appliance components, electric wire covering materials, and the like, which are required to have certain heat resistance and durability.

[Applications of (Meth)acrylic Resin]

A novel (meth)acrylate can be derived by converting one or both of the terminal hydroxyl groups of the PEPCD according to the present invention into a (meth)acrylate. In the method for producing a (meth)acrylate, any of anhydride, halide, and ester of the corresponding (methacrylate) may be used.

An active energy ray-polymerizable composition ((meth) acrylic resin) can be produced by mixing the above (meth) acrylate with other raw materials.

The above active energy ray-polymerizable composition is capable of being polymerized and cured in a short time when irradiated with an active energy ray, such as ultraviolet radiation. The active energy ray-polymerizable composition commonly has excellent clarity and enables formation of a cured product having excellent properties, such as toughness, flexibility, scratch resistance, and chemical resistance. For the above reasons, the active energy ray-polymerizable composition can be used in various fields, such as coating agents for plastics, binders for lens, sealants, and adhesives.

EXAMPLES

The present invention is described further specifically with reference to Examples and Comparative examples below. The present invention is not limited to Examples below without departing from the summary of the present invention.

[Evaluation Methods]

The methods for evaluating the PEPCD and polyurethane prepared in Examples and Comparative examples below are as described below.

[Terminal Alkoxy/Aryloxy Ratio of PEPCD]

The PEPCD was dissolved in $CDCl_3$. Subsequently, 400 MHz $^1$H-NMR (ECZ-400 produced by JEOL Ltd.) was measured. Calculation was done on the basis of an integral value of signals corresponding to each component.

$OCH_3$ terminal group: δ3.33 (s, 3H)

$OCH_2CH_2CH_2CH_3$ terminal group: δ0.91 (t, 3H) [0174]

[Viscosity of PEPCD]

The viscosity of the PEPCD was determined by subjecting 0.4 mL of the PEPCD to an E-type rotational viscometer (VISCOMETER TV-22L produced by Toki Sangyo Co., Ltd.; rotor: 3° R14) kept at 40° C.

The PEPCD was liquid. The viscosity of the PEPCD is preferably 300 to 5000 mPa·s.

[Hydroxyl Value and Number-Average Molecular Weight of PEPCD]

The hydroxyl value of the PEPCD was measured in accordance with JIS K1557-1 by a method in which an acetylating reagent was used.

The number-average molecular weight (Mn) was calculated using Formula (I) below on the basis of the hydroxyl value.

$$\text{Number-average molecular weight}=2\times 56.1/(\text{Hydroxyl value}\times 10^{-3}) \quad (I)$$

[Hydroxyl Value of Hydrolysate of PEPCD]

With 1 g of the PEPCD, 45 mL of methanol and 5 mL of a 25 weight % aqueous sodium hydroxide solution were mixed. The resulting mixture was heated at 75° C. for 30 minutes to perform hydrolysis. Subsequently, 7 mL of a 17.5 weight % aqueous hydrochloric acid solution was added to the resulting solution in order to neutralize the solution. Then, methanol was added to the solution such that the volume of the entire solution was 100 mL. The hydroxyl value of the resulting hydrolysate was measured as in the measurement of the hydroxyl value of the PEPCD.

[Hydroxyl Value and Number-Average Molecular Weight of PTMG]

The hydroxyl value and number-average molecular weight of PTMG were measured as in the measurement of those of the PEPCD.

[Molecular Weight of Polyurethane]

The polyurethane was dissolved in dimethylacetamide to form a dimethylacetamide solution having a concentration of 0.14% by weight. The dimethylacetamide solution was charged into GPC equipment [product name: "HLC-8220" produced by Tosoh Corporation (column: TskgelGMH-XL, 2 columns)] in order to measure the weight-average molecular weight (Mw) and number-average molecular weight (Mn) of the polyurethane in terms of standard polystyrene equivalent weight.

[Tensile Test of Polyurethane]

In accordance with JIS K6301(2010), each of the sheet-like polyurethane elastomers having a thickness of 1 mm which were prepared in Examples and Comparative examples was cut (Super Dumbbell Cutter Model: SDK-100) into a dumbbell specimen having a width of 10 mm and a length of 120 mm. The specimen was subjected to a tensile test using a tensile testing machine (product name: "TENSILON UTM-III-100" produced by Orientec Corporation) at a chuck distance of 50 mm, a cross head speed of 500 mm/min, a temperature of 23° C., and a relative humidity of 55% in order to measure the rupture elongation and rupture strength of the specimen. When the rupture elongation was 800% or more and the rupture strength was 20 MPa or more, the specimen was considered to have high modulus of elasticity.

[Abbreviations for Compounds]

The abbreviations for the compounds used in Examples and Comparative examples are as follows.

PTMG: Polyoxytetramethylene glycol
EC: Ethylene carbonate
Mg(acac)$_2$: Magnesium (II) acetylacetonate
BG: 1,4-Butanediol
MDI: 4,4'-Diphenylmethane diisocyanate
TEHP: Tris(2-ethylhexyl) phosphite

Example 1

Into a 1-liter four-necked glass flask equipped with a magnetic stirrer, a distillate trap, a pressure regulator, and a 400-mm Vigreux tube, 515 g of PTMG 1 (hydroxyl value: 613.1 mg-KOH/g, number-average molecular weight: 183), 285 g of EC, and 250 mg of Mg(acac)$_2$ were charged. Subsequently, the inside of the flask was replaced with a nitrogen gas. While stirring was performed, the internal temperature was increased to 150° C. to dissolve the contents by heat. Then, a reaction was conducted for 2 hours at normal pressure. Subsequently, the pressure was reduced to 80 to 40 kPa. Then, the reaction was conducted for 12 hours while ethylene glycol and EC were discharged to the outside of the system. Subsequently, 37 g of EC was added to the system. Then, the pressure was reduced to 40 to 20 kPa. The reaction was conducted at 150° C. for 8 hours. Subsequently, 37 g of EC was further added, the pressure was reduced to 40 to 18 kPa, and the reaction was continued for 10 hours.

Subsequently, 1.1 mL of a 8.5% aqueous phosphoric acid solution was added to the product in order to deactivate the catalyst. Then, the Vigreux tube was removed. The remaining monomers were removed at 1 kPa or less and 168° C. to 178° C. Hereby, a crude PEPCD was prepared.

The crude PEPCD was fed to a thin-film distillation apparatus at a flow rate of 20 g/min to perform thin-film distillation (temperature: 210° C., pressure: 53 Pa). Hereby, a PEPCD is prepared. The thin-film distillation apparatus used was Molecular Distillation Apparatus MS-300 Special Model produced by Sibata Scientific Technology Ltd. which was equipped with an inside capacitor having a diameter of 50 mm, a height of 200 mm, and an area of 0.0314 m$^2$ and a jacket. Table 1 lists the analytical values and physical properties of the PEPCD and the hydrolysate thereof.

<Production of Polyurethane Elastomer>

Into a reaction container equipped with a 300-mL SUS stirrer that had been heated to 90° C., 80 g of the PEPCD that had been heated to 90° C., 33.6 g of MDI, and 0.77 g of TEHP, which served as an inhibitor for urethanization reaction, were charged. After a lid had been put on the reaction container, a reaction was conducted for about 90 minutes while stirring was performed at reduced pressure (10 torr or less) at a speed of 2000 rpm. Subsequent to the reaction, when the amount of heat generation was reduced to a sufficient degree, 7.6 g of BG was gradually added to the reaction container. After stirring was performed for 2 minutes, the lid of the reaction container was removed. A fluororesin sheet (fluorine tape NITOFLON 900, thickness 0.1 mm, produced by Nitto Denko Corporation) was affixed to a glass plate. A silicon die (dimensions: 10 cm×10 cm, thickness: 2 mm) was placed on the fluororesin sheet. The resulting reaction solution was charged into the silicon die. The upper part of the silicon die was covered with a glass plate including a fluororesin sheet disposed on the bottom side of the glass plate. Then, a weight of 4.5 kg was placed on the glass plate disposed on the upper part of the die. Subsequently, the die was inserted into a dryer. In the dryer, heating was performed in a nitrogen atmosphere (110° C.×1 hour) to perform drying.

<Melt Molding>

The resulting polyurethane elastomer (dimensions: 10 cm×10 cm, thickness: 2 mm) was left to stand over a night and subsequently removed from the silicon die. Subsequently, drying was performed with a vacuum dryer (product name: "Vacuum Dryer ADP300" produced by Yamato Scientific Co., Ltd.) at 10 torr or less and 70° C. for 6 hours or more.

A fluororesin sheet and a melt molding die were placed, in this order, on a plate of a hot-pressing machine (product name: "Mini Test Press" produced by Toyo Seiki Seisaku-sho, Ltd.) that had been heated to 180° C. The melt molding die used had a size of 20 cm×20 cm×1 mm thick (hole size: 15 cm×8 cm×1 mm thick×2). The polyurethane elastomer was charged into the die, which was then covered with a fluororesin sheet. The polyurethane elastomer was melted using the plate of the hot-pressing machine (pressure: 0.5 MPa x temperature: 180° C.×time: 5 minutes). After the polyurethane elastomer had been melted, the pressure of the hot-pressing machine was gradually increased and heating was performed at 10 MPa at maximum for 5 minutes in order to perform molding. Subsequently, the pressure of the hot-pressing machine was reduced, and the resulting polyurethane elastomer molded article was removed. This molded article was placed in a pressing machine for cooling (product name: "Mini Test Press" produced by Toyo Seiki Seisaku-sho, Ltd.), which had been cooled with cooling water, and rapidly cooled (pressure: 10 MPa×time: 2 minutes) to form a sheet-like polyurethane elastomer molded article. Table 1 lists the results of evaluation of the physical properties of the polyurethane elastomer molded article.

Example 2

A PEPCD was prepared as in Example 1, except that EC was not added to the reaction container in the middle of the reaction. Table 1 lists the analytical values and physical properties of the PEPCD and the hydrolysate thereof.

A polyurethane elastomer was synthesized as in Example 1, except that the above PEPCD was used and the amounts of the materials charged were changed as described in Table 1. A polyurethane elastomer molded article was prepared as in Example 1. Table 1 lists the results of evaluation of the physical properties of the above molded article.

Example 3

A PEPCD was prepared as in Example 1, except that 515 g of PTMG4 (hydroxyl value: 461.7 mg-KOH/g, number-average molecular weight: 243) was used instead of PTMG1, and 285 g of EC, 250 mg of $Mg(acac)_2$, and 74 g of additional EC were used. Table 1 lists the analytical values and physical properties of the PEPCD and the hydrolysate thereof.

A polyurethane elastomer was synthesized as in Example 1, except that the above PEPCD was used and the amounts of the materials charged were changed as described in Table 1. A polyurethane elastomer molded article was prepared as in Example 1. Table 1 lists the results of evaluation of the physical properties of the above molded article.

Comparative Example 1

A PEPCD was prepared as in Example 1, except that 2453 g of PTMG2 (hydroxyl value: 461.5 mg-KOH/g, number-average molecular weight: 243) was used instead of PTMG1, and 1022 g of EC, 360 mg of $Mg(acac)_2$, and 667 g of additional EC were used. Table 1 lists the analytical values and physical properties of the PEPCD and the hydrolysate thereof.

A polyurethane elastomer was synthesized as in Example 1, except that the above PEPCD was used and the amounts of the materials charged were changed as described in Table 1. A polyurethane elastomer molded article was prepared as in Example 1. Table 1 lists the results of evaluation of the physical properties of the above molded article.

Comparative Example 2

A PEPCD was prepared as in Example 1, except that 202 g of PTMG3 (hydroxyl value: 431.5 mg-KOH/g, number-average molecular weight: 260) was used instead of PTMG1, and 79 g of EC, 38 mg of $Mg(acac)_2$, and 20 g of additional EC were used. Table 1 lists the analytical values and physical properties of the PEPCD and the hydrolysate thereof.

A polyurethane elastomer was synthesized as in Example 1, except that the above PEPCD was used and the amounts of the materials charged were changed as described in Table 1. A polyurethane elastomer molded article was prepared as in Example 1. Table 1 lists the results of evaluation of the physical properties of the above molded article.

TABLE 1

| | | | Example 1 | Example 2 | Example 3 | Comparative example 1 | Comparative example 2 |
|---|---|---|---|---|---|---|---|
| Synthesis of PEPCD | PTMG | Type | PTMG1 | PTMG1 | PTMG4 | PTMG2 | PTMG3 |
| | | Hydroxyl value (mg-KOH/g) | 613.1 | 613.1 | 461.7 | 461.5 | 431.5 |
| | | Number-average molecular weight (Mn) | 183 | 183 | 243 | 243 | 260 |
| | | Amount charged (g) | 515 | 515 | 515 | 2453 | 202 |
| | Carbonate compound | Type | EC | EC | EC | EC | EC |
| | | Amount charged (g) | 285 | 285 | 285 | 1022 | 79 |
| | | Additional amount charged (g) | 74 | 0 | 74 | 667 | 20 |
| | Catalyst | Type | $Mg(acac)_2$ | $Mg(acac)_2$ | Mg(acac)2 | $Mg(acac)_2$ | $Mg(acac)_2$ |
| | | Amount charged (mg) | 250 | 250 | 250 | 360 | 38 |
| Physical properties of PEPCD | Hydroxy value (mg-KOH/g) | | 59.9 | 112.1 | 54.8 | 52.6 | 94.7 |
| | Number-average molecular weight (Mn) | | 1873 | 1001 | 2049 | 2134 | 1185 |
| | Viscosity (mPa · s) | | 3150 | 720 | — | — | — |
| | Terminal alkoxy/aryloxy ratio (%) | | 1.35 | 0.40 | 5.1 | 8.35 | 0.15 |
| Hydroxyl value of hydrolysate of PEPCD (mg-KOH/g) | | | 613 | 613 | 243 | 462 | 432 |
| Synthesis of polyurethane elastomer | PEPCD | Amount charged (g) | 80.00 | 75.08 | 61.07 | 83.03 | 80.02 |
| | MDI | Amount charged (g) | 33.60 | 39.26 | 23.17 | 30.42 | 35.21 |
| | BG | Amount charged (g) | 7.6 | 6.8 | 5.3 | 7.0 | 6.0 |
| | TEHP | Amount charged (g) | 0.78 | 0.75 | 0.58 | 0.81 | 0.77 |
| Physical properties of polyurethane elastomer | Weight-average molecular weight (Mw) | | 195154 | 178333 | 107257 | 95365 | 275097 |
| | Number-average molecular weight (Mn) | | 86301 | 72066 | 48039 | 49807 | 86719 |
| | Mw/Mn | | 2.261 | 2.475 | 2.233 | 1.915 | 3.172 |
| | Tensile test | Rupture strength (MPa) | 25.0 | 29.0 | 42.2 | 7.1 | 16.9 |
| | | Rupture elongation (%) | 843 | 855 | 890 | 533 | 793 |

The results obtained in Examples 1, 2, and 3 and Comparative examples 1 and 2 confirm that a polyurethane that has excellent tensile properties and can be used for producing synthetic leather and the like can be readily produced by using the PEPCD according to the present invention, in which the terminal alkoxy/aryloxy ratio falls within the range specified in the present invention.

Although the present invention has been described in detail with reference to specific embodiments, it is apparent to a person skilled in the art that various modifications can be made therein without departing from the spirit and scope of the present invention.

The present application is based on Japanese Patent Application No. 2019-145523 filed on Aug. 7, 2019, which is incorporated herein by reference in its entirety.

The invention claimed is:

1. A polyether polycarbonate diol, wherein a ratio of a total number of terminal alkoxy groups and terminal aryloxy groups to a total number of all terminal groups is from 0.20% to 7.5%, wherein the polyether polycarbonate diol consists of a polyether carbonate diol formed from reacting polytetramethylene ether glycol (PTMG) with a carbonate compound and a transesterification catalyst present in an amount of 10 to 1500 μmol per mol of the polytetramethylene ether glycol (PTMG), wherein the polytetramethylene ether glycol (PTMG) has a hydroxyl value of from 280 mg-KOH/g to 750 mg-KOH/g, and wherein the terminal alkoxy groups and terminal aryloxy groups are represented by —O—$(CH_2)_4$—OR, wherein R is an alkyl or aryl group.

2. The polyether polycarbonate diol according to claim 1, wherein R is a methyl group.

3. The polyether polycarbonate diol according to claim 1, wherein R is a butyl group.

4. The polyether polycarbonate diol according to claim 1, the polyether polycarbonate diol having a hydroxyl value of from 11 mg-KOH/g to 320 mg-KOH/g.

5. The polyether polycarbonate diol according to claim 1, wherein a hydrolysis product produced by mixing the polyether polycarbonate diol with methanol and a 25 weight %-aqueous sodium hydroxide solution, and heating the resulting mixture at 75° C. for 30 minutes to perform hydrolysis, has a hydroxyl value of from 280 mg-KOH/g to 750 mg-KOH/g.

6. The polyether polycarbonate diol according to claim 1, wherein the polytetramethylene ether glycol (PTMG) has a hydroxyl value of from 370 mg-KOH/g to 750 mg-KOH/g.

7. The polyether polycarbonate diol according to claim 1, wherein a molar ratio of the carbonate compound to the polytetramethylene ether glycol (PTMG) is from 0.35 to 0.97.

8. The polyether polycarbonate diol according to claim 1, wherein the ratio of the total number of terminal alkoxy groups and terminal aryloxy groups to the total number of all terminal groups is from 0.30% to 6.0%.

9. The polyether polycarbonate diol according to claim 1, wherein the carbonate compound is at least one selected from the group consisting of an alkylene carbonate, a dialkyl carbonate, and a diaryl carbonate.

10. The polyether polycarbonate diol according to claim 1, wherein a number-average molecular weight of the polytetramethylene ether glycol (PTMG) is from 200 to 400, determined on a basis of hydroxyl groups.

11. The polyether polycarbonate diol according to claim 1, wherein the carbonate compound is at least one selected from the group consisting of ethylene carbonate, propylene carbonate, butylene carbonate, dimethyl carbonate, diethyl carbonate, dibutyl carbonate, methyl ethyl carbonate, diphenyl carbonate, dinaphthyl carbonate, phenyl naphthyl carbonate, methyl chlorocarbonate, and phenyl chlorocarbonate.

12. The polyether polycarbonate diol according to claim 1, wherein the carbonate compound is at least one selected from the group consisting of ethylene carbonate and dimethyl carbonate.

13. The polyether polycarbonate diol according to claim 1, wherein the carbonate compound is an alkylene carbonate which is at least one selected from the group consisting of ethylene carbonate and butylene carbonate.

14. A method for producing the polyether polycarbonate diol according to claim 1, the method comprising:

reacting polytetramethylene ether glycol having a hydroxyl value of from 280 mg-KOH/g to 750 mg-KOH/g with a carbonate compound.

15. A method for producing a polyurethane, the method comprising:

conducting an addition polymerization reaction of the polyether polycarbonate diol according to claim 1 with a raw material including a compound having a plurality of isocyanate groups.

16. The method for producing a polyurethane according to claim 15, wherein the polyurethane is a polyurethane elastomer.

17. The method for producing a polyurethane according to claim 16, wherein the polyurethane elastomer is a polyurethane foam.

* * * * *